United States Patent
Sato et al.

(10) Patent No.: US 11,880,023 B2
(45) Date of Patent: Jan. 23, 2024

(54) ZOOM LENS AND IMAGING APPARATUS

(71) Applicant: TAMRON CO., LTD., Saitama (JP)

(72) Inventors: Masaki Sato, Saitama (JP); Yuki Mori, Saitama (JP); Hironori Taguchi, Saitama (JP)

(73) Assignee: Tamron Co., Ltd., Saitama (JP)

( * ) Notice: Subject to any disclaimer, the term of this patent is extended or adjusted under 35 U.S.C. 154(b) by 292 days.

(21) Appl. No.: 17/093,829

(22) Filed: Nov. 10, 2020

(65) Prior Publication Data

US 2021/0294082 A1 Sep. 23, 2021

(30) Foreign Application Priority Data

Mar. 17, 2020 (JP) ................. 2020-046679

(51) Int. Cl.
*G02B 15/14* (2006.01)
*G02B 15/177* (2006.01)

(52) U.S. Cl.
CPC ........... *G02B 15/143507* (2019.08); *G02B 15/144511* (2019.08); *G02B 15/177* (2013.01)

(58) Field of Classification Search
CPC .......... G02B 15/143507; G02B 15/177; G02B 15/1425; G02B 13/006
See application file for complete search history.

(56) References Cited

U.S. PATENT DOCUMENTS

| | | | |
|---|---|---|---|
| 8,520,316 B2 | 8/2013 | Huang et al. | |
| 9,148,575 B2 | 9/2015 | Yamasaki | |
| 2006/0127075 A1* | 6/2006 | Minakata | G02B 15/143507 396/72 |
| 2015/0054988 A1* | 2/2015 | Kimura | G02B 15/1425 359/680 |
| 2018/0180848 A1* | 6/2018 | Ito | G02B 15/177 |
| 2018/0326909 A1* | 11/2018 | Iwashita | B60R 1/02 |

FOREIGN PATENT DOCUMENTS

| | | | | |
|---|---|---|---|---|
| CH | 111352223 A | * | 6/2020 | ........... G02B 15/177 |
| JP | 2011-242517 A | | 12/2011 | |
| JP | 2013-134498 A | | 7/2013 | |
| JP | 2014-202841 A | | 10/2014 | |

* cited by examiner

*Primary Examiner* — Darryl J Collins
(74) *Attorney, Agent, or Firm* — Paratus Law Group, PLLC

(57) ABSTRACT

A zoom lens according to the present invention includes sequentially from an object side: a first lens group having negative refractive power, and a second lens group having positive refractive power, and performs a magnification change operation by changing a gap between the adjacent lens groups. The zoom lens has specific optical characteristics represented by four expressions relating to the second lens group.

7 Claims, 16 Drawing Sheets

ZOOM LENS AND IMAGING APPARATUS

CROSS-REFERENCE TO RELATED APPLICATIONS

This application is based on and claims the benefit of priority from Japanese Patent Application No. 2020-046679, filed on Mar. 17, 2020, the entire contents of which are incorporated herein by reference.

BACKGROUND OF THE INVENTION

Technical Field

The present invention relates to a zoom lens and an imaging apparatus.

Related Art

The use of imaging apparatuses equipped with solid-state image sensors such as charge coupled devices (CCDs) and complementary metal-oxide semiconductors (CMOSs) has become rapidly widespread in a wide range of fields. Examples of such imaging apparatuses include single lens reflex cameras, digital still cameras, video cameras, and surveillance cameras. With the expansion of such widespread use, the demand for lenses compatible with solid-state image sensors in imaging apparatuses is on the rise.

In recent years, solid-state image sensors have a larger number of pixels and higher sensitivity, and there is a demand for high-resolution and bright lenses. In addition, a further reduction in size of and widespread use of imaging apparatuses require compact, lightweight, and low-cost lenses for imaging apparatuses, such as zoom lenses. Furthermore, due to advances in artificial intelligence and image recognition technology, the lenses of imaging apparatuses are required to have high performance in which aberrations are corrected in a wide wavelength range, which enables shooting at anytime during the day or night.

As lenses of such imaging apparatuses as described above, for example, a zoom lens is known that includes a first lens group having negative refractive power and a second lens group having positive refractive power, that is compact and lightweight, and that has bright and satisfactory optical performance. This zoom lens is designed for the purpose of suppressing changes in performance due to temperature changes and further reducing cost, while achieving a wide angle system with a compact size, a large aperture ratio, and high performance. The second lens group includes a resin lens having an extraordinary dispersion property (see, for example, JP 2011-242517 A).

Furthermore, another zoom lens is known that includes a first lens group having negative refractive power, a second lens group having positive refractive power, and a third lens group having positive refractive power, which has a large aperture, and which covers a wide angle while achieving satisfactory optical performance. The second lens group includes a resin lens having an extraordinary dispersion property as a positive lens (see, for example, JP 2013-134498 A and JP 2014-202841 A).

SUMMARY OF THE INVENTION

In the zoom lens described in JP 2011-242517 A, the entire second lens group has weak positive refractive power, which makes it difficult to reduce the size of the zoom lens. In each of the zoom lenses described in JP 2013-134498 A and JP 2014-202841 A, the resin lens has weak positive refractive power, and thus effects of the resin lens having the extraordinary dispersion property fail to be sufficiently exhibited. Therefore, it is difficult for the zoom lenses described in JP 2013-134498 A and JP 2014-202841 A to sufficiently correct chromatic aberrations over a wide wavelength range. Furthermore, in the zoom lenses described in JP 2013-134498 A and JP 2014-202841 A, the entire second lens group has weak positive refractive power, which makes it difficult to reduce the sizes of the zoom lenses.

As described above, conventional zoom lenses have room for study from the viewpoint of sufficiently achieving all of the size reduction, weight reduction, and higher optical characteristics.

An object of one aspect of the present invention is to provide a zoom lens and an imaging apparatus that are compact and lightweight and have high optical performance.

In order to solve the above-mentioned problems, a zoom lens according to one aspect of the present invention includes sequentially from an object side: a first lens group having negative refractive power, and a second lens group having positive refractive power, and the zoom lens performs a magnification change operation by changing a gap between the adjacent lens groups. The second lens group includes a lens Lp having positive refractive power. The zoom lens satisfies following expressions (1) to (4):

$$0.85 < f_2/f_{2p} < 1.50 \tag{1}$$

$$0 < f_2/f_w < 3.25 \tag{2}$$

$$-0.30 < \Delta Pdt\_2p < -0.10 \tag{3}$$

$$1.50 < Nd_2 < 2.00 \tag{4}$$

where
$f_2$ is a focal length of the second lens group,
$f_{2p}$ is a focal length of the lens Lp,
$f_w$ is a focal length at a wide angle end of the zoom lens in infinity focus,
$\Delta Pdt\_2p$ is an extraordinary dispersion property between a d line and a t line of the lens Lp, and
$Nd_2$ is a refractive index of the lens Lp at the d line.

Furthermore, in order to solve the above-mentioned problems, an imaging apparatus according to one aspect of the present invention includes: the above-mentioned zoom lens, and a solid-state image sensor disposed on an image side of the zoom lens and configured to convert an optical image formed by the zoom lens into an electrical signal.

According to one aspect of the present invention, it is possible to provide a zoom lens and an imaging apparatus that are compact and lightweight and have high optical performance.

DESCRIPTION OF THE EMBODIMENTS

1. Zoom Lens 1.1 Optical Configuration

Figure 1:
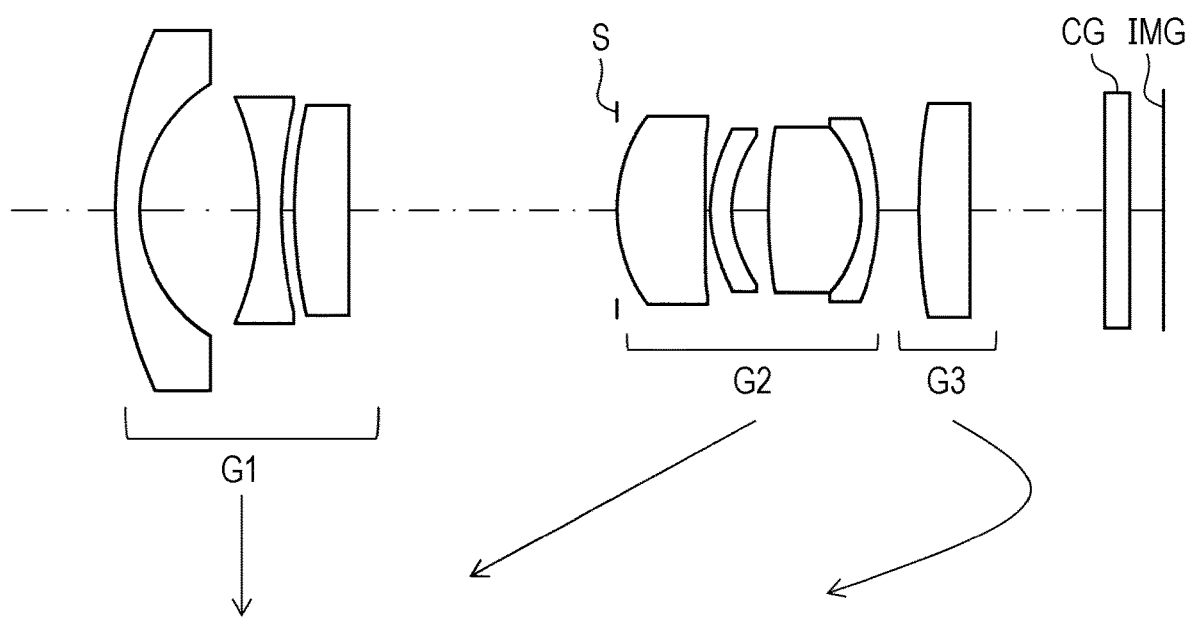
FIG. 1 is a diagram schematically showing an optical configuration at a wide angle end of a zoom lens of Example 1 in infinity focus.

A zoom lens according to one embodiment of the present invention includes a first lens group having negative refractive power and a second lens group having positive refractive power that are sequentially arranged from an object side. The second lens group includes a positive lens having a specific extraordinary dispersion property. Therefore, the zoom lens can capture an image in which chromatic aberration is corrected in a wide wavelength range, and the zoom lens is compact and lightweight.

The term "lens group" used herein means a set of lenses interlocking in a magnification change operation. The lens group may be composed of a single lens or may be composed of a plurality of lenses. The lenses in the lens group move in the magnification change operation, while maintaining a relative positional relationship. The magnification change operation is performed by changing the gap between the lens groups, and the gap between lenses belonging to the same lens group does not change in the magnification change operation.

The lens used herein is not limited to one single lens, and may be a cemented lens including a plurality of single lenses that are integrated with no air gap therebetween, or may be a compound lens including one single lens and resin that are integrated with no air gap therebetween.

Furthermore, as used herein, a lens having positive refractive power is referred to as a "positive lens", and a lens having negative refractive power is referred to as a "negative lens".

(1) First Lens Group

The first lens group is a lens group disposed closest to the object side in the zoom lens and has negative refractive power. It suffices if the first lens group has negative refractive power as a whole and has at least one negative lens. The configuration of the lens(es) in the first lens group can be determined as appropriate within a range that the lens group has negative refractive power as a whole.

(2) Second Lens Group

The second lens group is a lens group disposed on an image side of the first lens group and has positive refractive power. It suffices if the second lens group has positive refractive power as a whole and has at least one lens Lp. The lens Lp preferably has positive refractive power and satisfies the conditions described later. The second lens group more preferably has two or more lenses Lp from the viewpoint of satisfactorily correcting chromatic aberration. The configuration of the lens(es) in the second lens group can be determined as appropriate within a range that the lens group has positive refractive power as a whole.

The lens Lp is preferably a plastic lens. The use of a plastic lens as the lens Lp is preferable from the viewpoints of appropriately correcting various aberrations, lowering the cost, and reducing the weight of the second lens group. The plastic lens is preferably an aspherical lens from the viewpoints of cost reduction and effective aberration correction.

The second lens group may include a negative lens, and at least one negative lens in the second lens group is preferably a plastic lens. The use of a plastic lens as the negative lens is advantageous from the viewpoints of cost reduction and the weight reduction of the second lens group. The plastic lens is preferably an aspherical lens from the viewpoints of cost reduction and effective aberration correction. Furthermore, the use of a plastic lens as at least one negative lens in the second lens group is preferable particularly from the viewpoint of achieving effective correction of Petzval sum.

(3) Focus Group

The zoom lens may include a focus group. The focus group is composed of at least one lens that moves in an optical axis direction of the zoom lens in focusing from infinity to a nearby object. The focus group may be the entire lens group that moves in the optical axis direction for focusing, or at least one lens, in the zoom lens, that moves in the optical axis direction for focusing. The position and refractive power of the focus group in focusing are not limited.

(4) Stop

The zoom lens may include a stop. The "stop" used herein is a stop that defines the luminous flux diameter of the zoom lens, that is, a stop that defines the F value of the zoom lens. Where to dispose the stop in the zoom lens is not limited.

(5) Lens Group Configuration

This zoom lens includes sequentially from the object side: the first lens group having negative refractive power and the second lens group having positive refractive power. The zoom lens of the present embodiment may further include a lens group other than the first lens group and the second lens group within a range that can achieve the effects of the present embodiment. Where to dispose this lens group in the zoom lens can be determined as appropriate within a range that satisfies the positional relationship between the first lens group and the second lens group described above. For example, the other lens group described above may be located closer to the image side than the second lens group is. The other lens group may be one or more.

The zoom lens of the present embodiment may further include an optical element other than the above-described lens group and stop within a range that can achieve the effects of the present embodiment. The other optical element may be one or more. Examples of the other optical element include filters. The filters can be selected as appropriate within a range that exhibits desired optical characteristics in the present embodiment.

1-2. Operations (1) Operation During Magnification Change

The zoom lens of the present embodiment performs a magnification change operation by changing the gap between adjacent lens groups. "Changing the gap between adjacent lens groups" means changing the air gap between adjacent lens groups. In magnification change, the first lens group and the second lens group preferably move relative to each other from a wide angle end to a telephoto end such that the air gap between the two lens groups decreases, from the viewpoint of achieving a desired magnification change ratio.

The zoom lens may further include the other lens group described above, and a trajectory of the other lens group connecting the position of a wide angle end and the position of a telephoto end of the other lens group may have a shape directed toward the image side and then toward the object side. For example, the zoom lens may include another lens group disposed closer to the image side than the second lens group is, and the other lens group may have the trajectory having the above-described shape. This configuration is preferable from the viewpoint of enhancing the image plane property at the intermediate focal length.

(2) Operation During Focusing

In the zoom lens, the focus group described above can perform focusing. The focus group that moves when focusing from infinity to a nearby object may be any lens or lens group as described above. Furthermore, the direction of movement of the focus group during the focusing is not limited.

1-3. Expressions Expressing Conditions of Zoom Lens

The zoom lens according to the present embodiment, which adopts the above-described configuration, preferably satisfies one or more of the expressions described below.

Expression (1) defines a ratio of the focal length of the second lens group to the focal length of the lens Lp in the second lens group:

$$0.85 < f_2/f_{2p} < 1.50 \quad (1)$$

where $f_2$ is the focal length of the second lens group, and
$f_{2p}$ is the focal length of lens Lp.

Satisfying Expression (1) is preferable from the viewpoint of appropriately setting the focal length of the positive lens included in the second lens group, and from the viewpoint of appropriately correcting spherical aberration and longitudinal chromatic aberration generated in the second lens group.

If $f_2/f_{2p}$ is below the lower limit of Expression (1), the focal length of the positive lens included in the second lens group can be excessively short. For this reason, spherical aberration and longitudinal chromatic aberration generated in the second lens group may increase, which can make it difficult to obtain satisfactory optical performance. When $f_2/f_{2p}$ exceeds the upper limit of Expression (1), the focal length of the positive lens included in the second lens group may be excessively long. For this reason, the correction of spherical aberration and longitudinal chromatic aberration generated in the second lens group may be insufficient, and it may be difficult to reduce the size of the zoom lens.

From the viewpoint of obtaining satisfactory optical performance, $f_2/f_{2p}$ more preferably exceeds 0.87 and further more preferably exceeds 0.89. Furthermore, from the viewpoints of achieving satisfactory optical performance and reducing the size of the zoom lens, $f_2/f_{2p}$ is more preferably less than 1.45 and further more preferably less than 1.40.

Expression (2) defines a ratio of the focal length of the second lens group to the focal length at the wide angle end of the zoom lens in infinity focus:

$$0 < f_2/f_w < 3.25 \quad (2)$$

where $f_2$ is the focal length of the second lens group, and
$f_w$ is the focal length at the wide angle end of the zoom lens in infinity focus.

Satisfying Expression (2) is preferable from the viewpoints of appropriately setting the focal length of the second lens group, and from the viewpoint of appropriately correcting spherical aberration, astigmatism, and longitudinal chromatic aberration generated in the second lens group.

If $f_2/f_w$ is below the lower limit of Expression (2), the focal length of the second lens group can be excessively short. For this reason, spherical aberration, astigmatism, and longitudinal chromatic aberration generated in the second lens group may increase, which can make it difficult to obtain satisfactory optical performance. If $f_2/f_w$ exceeds the upper limit of Expression (2), the focal length of the second lens group can be excessively long. For this reason, the correction of spherical aberration, astigmatism, and longitudinal chromatic aberration generated in the second lens group may be insufficient, and it may be difficult to reduce the size of the zoom lens.

From the viewpoint of obtaining satisfactory optical performance, $f_2/f_w$ more preferably exceeds 1.00, further more preferably exceeds 1.50, and even more preferably exceeds 2.00.

Furthermore, from the viewpoints of achieving satisfactory optical performance and reducing the size of the zoom lens, $f_2/f_w$ is more preferably less than 3.00 and further more preferably less than 2.80.

Expression (3) defines an extraordinary dispersion property with respect to a d line and a t line of the lens Lp included in the second lens group:

$$-0.30 < \Delta Pdt\_2p < -0.10 \quad (3)$$

where $\Delta Pdt\_2p$ is the extraordinary dispersion property between the d line and the t line of the lens Lp.

Here, "the extraordinary dispersion property between the d line and the t line" represents the deviation between a point on a reference line corresponding to the Abbe number of the lens Lp and a partial variance ratio of the lens Lp where the reference line is a straight line passing through coordinates C7 (partial variance ratio between the d line and the t line: 1.1337, vd: 60.49) and F2 (partial variance ratio between the d line and the t line: 1.0009, vd: 36.30) on a graph whose vertical axis represents the partial variance ratio between the d line and the t line and horizontal axis represents the Abbe number vd.

Satisfying Expression (3) is preferable from the viewpoint of correcting longitudinal chromatic aberration and chromatic aberration of magnification over a broad wavelength range for the second lens group, including the near-infrared range from the C line to the t line as well as the visual light range from the d line to the C line.

When ΔPdt_2p is below the lower limit of Expression (3), the absolute value of the extraordinary dispersion property of the positive lens included in the second lens group may be excessively large. For this reason, the correction of chromatic aberration in the wavelength range including the t line may be excessive, which can make it difficult to obtain satisfactory optical performance for light in the wavelength range from the d line to the t line. When ΔPdt_2p exceeds the upper limit of Expression (3), the absolute value of the extraordinary dispersion property of the positive lens included in the second lens group may be excessively small. For this reason, the chromatic aberration in the wavelength range including the t line may increase, which can make it difficult to obtain satisfactory optical performance for light in the wavelength range from the d line to the t line.

The value of ΔPdt_2p can be determined as appropriate from the range represented by Expression (3) in the range in which chromatic aberration is appropriately corrected in the broad wavelength range as described above.

Expression (4) defines the refractive index of the lens Lp with respect to the d line:

$$1.50 < Nd_2 < 2.00 \tag{4}$$

where $Nd_2$ is the refractive index of the lens Lp at the d line.

Satisfying Expression (4) is preferable from the viewpoint of appropriately setting the refractive index of the lens Lp included in the second lens group with respect to the d line, and from the viewpoint of appropriately correcting spherical aberration and longitudinal chromatic aberration generated in the second lens group.

When $Nd_2$ is below the lower limit of Expression (4), the correction of spherical aberration generated in the second lens group may be insufficient, and it may be difficult to reduce the size of the zoom lens. When $Nd_2$ exceeds the upper limit of Expression (4), the longitudinal chromatic aberration generated in the second lens group may increase, which can make it difficult to obtain satisfactory optical performance.

The value of $Nd_2$ can be determined as appropriate from the range represented by Expression (4) in the range in which the spherical aberration and the longitudinal chromatic aberration generated in the second lens group are appropriately corrected.

Expression (5) defines a ratio of the focal length of the lens Lp in the second lens group to the focal length at the wide angle end of the zoom lens in infinity focus:

$$1.80 < f_{2p}/f_w < 3.50 \tag{5}$$

where $f_{2p}$ is the focal length of the lens Lp, and
$f_w$ is the focal length at the wide angle end of the zoom lens in infinity focus.

Satisfying Expression (5) is preferable from the viewpoint of appropriately setting the focal length of the positive lens included in the second lens group, and from the viewpoint of appropriately correcting spherical aberration mainly generated in the second lens group.

When $f_{2p}/f_w$ is below the lower limit of Expression (5), the correction of spherical aberration generated in the second lens group may be insufficient, and it may be difficult to reduce the size of the zoom lens. When $f_{2p}/f_w$ exceeds the upper limit of Expression (5), the spherical aberration generated in the second lens group may increase. For this reason, the correction of spherical aberration in the entire system may be excessive, which can make it difficult to obtain satisfactory optical performance.

$f_{2p}/f_w$ more preferably exceeds 2.00 and further more preferably exceeds 2.20 from the viewpoint of appropriately correcting the spherical aberration generated in the second lens group and from the viewpoint of reducing the size of the zoom lens. Furthermore, $f_{2p}/f_w$ is more preferably less than 3.30 and further more preferably less than 3.10 from the viewpoint of appropriately correcting spherical aberration in the entire system.

Expression (6) defines the lateral magnification at the telephoto end of the second lens group with respect to the lateral magnification at the wide angle end of the second lens group:

$$1.5 < \beta_{2t}/\beta_{2w} < 4.0 \tag{6}$$

where $\beta_{2t}$ is the lateral magnification at the telephoto end of the second lens group, and
$\beta_{2w}$ is the lateral magnification at the wide angle end of the second lens group.

Satisfying Expression (6) is preferable from the viewpoint of appropriately achieving an appropriate magnification change ratio from the wide angle end to the telephoto end of the second lens group, the viewpoint of reducing the size of the zoom lens, and the viewpoint of suppressing aberration variations during magnification change.

When $\beta_{2t}/\beta_{2w}$ is below the lower limit of Expression (6), the magnification change ratio obtained by moving the second lens group may be small, which can make it difficult to reduce the size of the zoom lens. When $\beta_{2t}/\beta_{2w}$ exceeds the upper limit of Expression (6), the magnification change ratio obtained by moving the second lens group may be large, which can facilitate the reduction in the size of the zoom lens. However, aberration variations during magnification change may increase, which can make it difficult to obtain high optical performance over the entire zoom range.

$\beta_{2t}/\beta_{2w}$ is more preferably less than 3.80 and further more preferably less than 3.60 from the viewpoint of obtaining high optical performance over the entire zoom region. The lower limit of $\beta_{2t}/\beta_{21}$ can be appropriately determined from the range represented by Expression (6) from the viewpoint of achieving a desired magnification change ratio and from the viewpoint of reducing the size of the zoom lens.

Expression (7) defines a ratio of the focal length of the cemented lens in the second lens group to the radius of curvature of the cemented surface of the cemented lens:

$$3.0 < |f_s/R_s| < 20.0 \tag{7}$$

where $f_s$ is the focal length of the above-described cemented lens, and
$R_s$ is the radius of curvature of the cemented surface of the above-described cemented lens.

Satisfying Expression (7) is preferable from the viewpoint of appropriately setting the focal length of the cemented lens included in the second lens group and the radius of curvature of the cemented surface of the cemented lens, and is preferable from the viewpoint of appropriately correcting chromatic aberration generated mainly in the second lens group.

When $|f_s/R_s|$ is below the lower limit of Expression (7), the radius of curvature of the cemented surface of the cemented lens in the second lens group may be excessively large, and therefore the power of the cemented surface can be weakened. For this reason, the correction of longitudinal chromatic aberration and chromatic aberration of magnification generated in the second lens group may be insufficient, which can make it difficult to obtain satisfactory optical performance. If $|f_s/R_s|$ exceeds the upper limit of Expression (7), the radius of curvature of the cemented surface of the cemented lens in the second lens group may be excessively small, and therefore the power of the cemented surface can increase. For this reason, longitudinal chromatic aberration and chromatic aberration of magnification generated in the second lens group may increase, which can make it difficult to obtain satisfactory optical performance.

$|f_s/R_s|$ more preferably exceeds 3.50 and further more preferably exceeds 4.00 from the viewpoint of appropriately correcting longitudinal chromatic aberration and chromatic aberration of magnification generated in the second lens group. Furthermore, $|f_s/R_s|$ is more preferably less than 15.0 and further more preferably less than 10.0 from the viewpoint of appropriately correcting longitudinal chromatic aberration and chromatic aberration of magnification generated in the second lens group.

Expression (8) defines the focal length of the first lens group with respect to the focal length at the wide angle end of the zoom lens in infinity focus:

$$-2.8 < f_1/f_w < -1.5 \quad (8)$$

where $f_1$ is the focal length of the first lens group, and $f_w$ is the focal length at the wide angle end of the zoom lens in infinity focus.

Satisfying Expression (8) is preferable from the viewpoint of achieving an appropriate focal length of the first lens group, the viewpoint of achieving a wider zoom lens in particular, the viewpoint of reducing the size of the zoom lens, and the viewpoint of appropriately correcting coma aberration and field curvature.

When $f_1/f_w$ is below the lower limit of Expression (8), the refractive power of the first lens group may be excessively weak, which can make it difficult to achieve a wider zoom lens with a reduced size. When $f_1/f_w$ exceeds the upper limit of Expression (8), the refractive power of the first lens group may be excessively strong, which can make it difficult to correct coma aberration and field curvature.

From the viewpoint of achieving a wider zoom lens with a reduced size, $f_1/f_w$ more preferably exceeds −2.50 and further more preferably exceeds −2.20. Furthermore, $f_1/f_w$ is more preferably less than −1.60 and further more preferably less than −1.70 from the viewpoint of appropriately correcting coma aberration and field curvature.

2. Imaging Apparatus

Next, an imaging apparatus according to one embodiment of the present invention will be described. The imaging apparatus includes the zoom lens according to the above-described embodiment and an image sensor that converts an optical image formed by the zoom lens into an electrical signal. The image sensor is provided on the image plane side of the zoom lens.

Here, the image sensor is not limited, and may be a solid-state image sensor such as a CCD sensor and a CMOS sensor. The imaging apparatus according to the present embodiment is suitable for an imaging apparatus including the above-mentioned solid-state image sensor, such as a digital camera and a video camera. Furthermore, the imaging apparatus may be a fixed-lens imaging apparatus in which a lens is fixed to a housing, or may be an interchangeable lens imaging apparatus such as a single lens reflex camera and a mirrorless camera. In particular, the zoom lens according to the present embodiment can secure back focus suitable for an interchangeable lens system. The zoom lens is thus suitable for an imaging apparatus such as a single lens reflex camera provided with an optical viewfinder, a phase difference sensor, a reflex mirror for distributing light to these, and the like.

Figure 16:
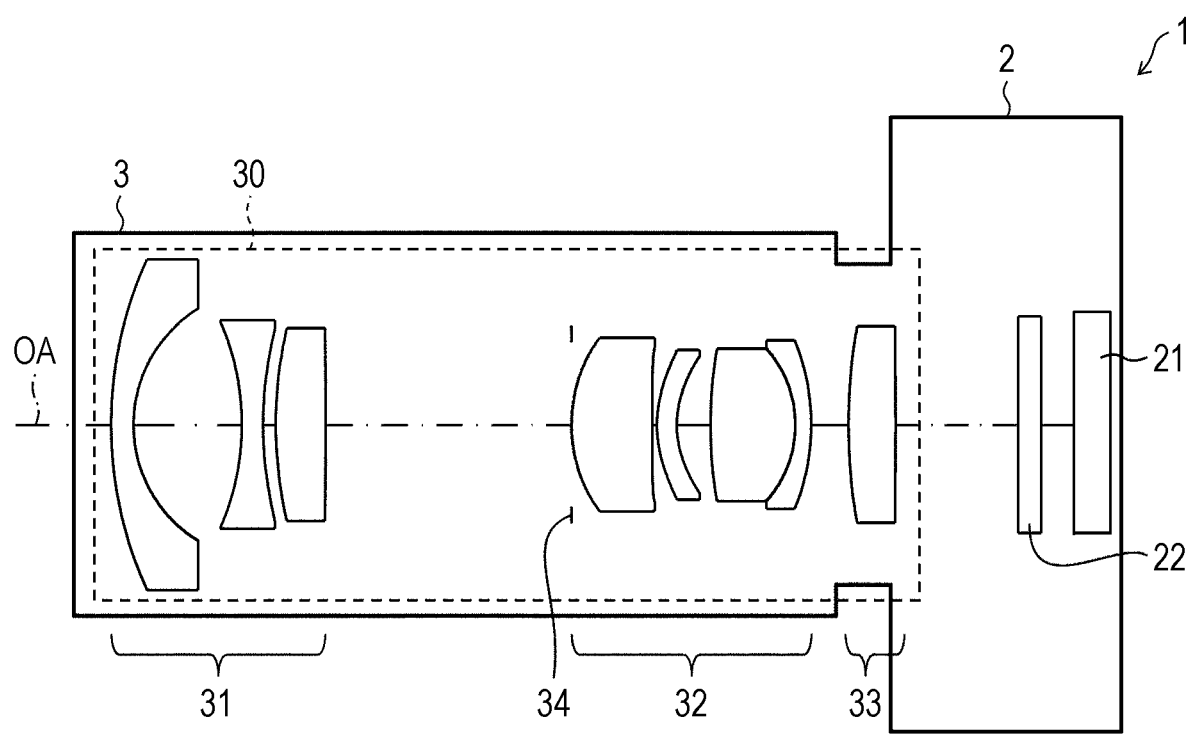
FIG. 16 is a diagram schematically showing an example of a configuration of an imaging apparatus according to one embodiment of the present invention.

FIG. 16 is a diagram schematically showing an example of a configuration of the imaging apparatus according to the present embodiment. As shown in FIG. 16, a mirrorless camera 1 includes a body 2 and a barrel 3 that can be detachably attached to the body 2. The mirrorless camera 1 is an aspect of an imaging apparatus.

The barrel 3 includes a zoom lens 30. The zoom lens 30 includes a first lens group 31, a second lens group 32, and a third lens group 33. The zoom lens 30 is configured such that, for example, the first lens group 31 and the second lens group 32 satisfy at least Expressions (1) to (4) described above. A stop 34 is disposed between the first lens group 31 and the second lens group 32.

The first lens group 31 has negative refractive power, the second lens group 32 has positive refractive power, and the third lens group 33 has negative refractive power. The second lens group 32 includes the above-described lens Lp having positive refractive power.

The body 2 includes a CCD sensor 21, serving as an image sensor, and a cover glass 22. The CCD sensor 21 is positioned such that an optical axis OA of the zoom lens 30 in the barrel 3 mounted on the body 2 serves as the central axis of the CCD sensor 21 in the body 2.

The imaging apparatus according to the present embodiment preferably includes an image processing unit that electrically processes captured image data acquired by the image sensor to change the shape of captured images, an image correction data holding unit that holds image correction data and image correction programs used for processing the captured image data by the image processing unit, and the like.

With a zoom lens having a reduced size, distortion tends to occur in the shape of captured images formed on an imaging plane. When this happens, it is preferable to correct the distortion of the shape of captured images. This correction can be performed, for example, by causing the image correction data holding unit to hold distortion correction data for correcting distortion of the shape of captured images in advance and by causing the image processing unit to use the distortion correction data held in the image correction data holding unit. With such an imaging apparatus, it is possible to further reduce the size of the zoom lens, obtain beautiful captured images, and reduce the size of the entire imaging apparatus.

Furthermore, in the imaging apparatus according to the present embodiment, the image correction data holding unit preferably holds correction data for chromatic aberration of magnification in advance. Furthermore, the image processing unit preferably uses the correction data for chromatic aberration of magnification held in the image correction data holding unit for performing correction of chromatic aberration of magnification of the captured images. The image processing unit corrects chromatic aberration of magnification, that is, color distortion, thereby enabling reduction in the number of lenses included in the optical system. With such an imaging apparatus, it is thus possible to further reduce the size of the zoom lens, obtain beautiful captured images, and reduce the size of the entire imaging apparatus.

The present invention is not limited to the above-described embodiments, and various modifications can be made within the scope of the claims. Embodiments obtained by combining the technical means disclosed in different embodiments as appropriate are also included in the technical scope of the present invention.

EXAMPLES

Examples of the present invention will be described below. In each of the following tables, the unit of length is "mm" and the unit of angle of view is "°".

Example 1

FIG. 1 is a diagram schematically showing an optical configuration at a wide angle end of a zoom lens of Example 1 in infinity focus. The lens of Example 1 includes sequentially from an object side: a first lens group G1 having negative refractive power, a second lens group G2 having positive refractive power, and a third lens group G3 having positive refractive power. A stop S is disposed closest to the object side of the second lens group G2.

A cover glass CG is disposed between the third lens group G3 and an image plane IMG. The second lens group G2 includes sequentially from the object side: a lens (lens Lp) having positive refractive power, a lens having negative refractive power, and a cemented lens including a lens having positive refractive power and a lens having negative refractive power.

The zoom lens of Example 1 performs a magnification change operation by changing air gaps between the lens groups. In the figure, the arrows shown below the lens groups indicate the trajectory of the movement of each lens group when moving from the wide angle end to a telephoto end via an intermediate focal length state. During the magnification change from the wide angle end to the telephoto end, the first lens group G1 is fixed in the optical axis direction. The second lens group G2 gradually moves toward the object side. The third lens group G3 moves toward the image side and then toward the object side. More specifically, the magnification change is performed by the second lens group G2 moving toward the object side as described above, whereas correction of the focal position and focusing through the magnification change are performed by the third lens group G3 moving as described above.

Next, an example in which specific numerical values of the zoom lens are applied will be described. Table 1 is a table of surface data of the zoom lens of Example 1.

In the table, "r" represents the radius of curvature, and "d" represents the lens thickness or lens gap. "Nd" represents the refractive index for the d line (wavelength λ=587.56 nm), and "vd" represents the Abbe number for the d line. Furthermore, "ΔPdt" represents the deviation between a point on a reference line corresponding to the Abbe number and a partial variance ratio with respect to the d line and the t line. More specifically, "ΔPdt" represents the deviation between a point on a reference line corresponding to the Abbe number of a lens and a partial variance ratio of the lens where the reference line is a straight line passing through coordinates C7 (partial variance ratio between the d line and the t line: 1.1337, vd: 60.49) and F2 (partial variance ratio between the d line and the t line: 1.0009, vd: 36.30) on a graph whose vertical axis represents the partial variance ratio between the d line and the t line and horizontal axis represents the Abbe number vd.

The mark "*" in the table indicates that the lens is an aspherical lens, and "S" indicates the stop. "INF" means infinity. Such indication as "D(6)" in the column "d" indicates that the gap on the optical axis of the lens surface is a variable gap that changes during the magnification change or focusing.

In Table 1, surface numbers 1 to 6 are the surface numbers of the lenses in the first lens group G1, and surface numbers 7 to 13 are the surface numbers of the lenses in the second lens group G2. Surface number 7 represents the stop and the surface of the lens closest to the object side of the second lens group G2. Surface numbers 14 and 15 are the surface numbers of the lenses in the third lens group G3. Surface numbers 16 and 17 represent the cover glass, and surface number 18 represents the image plane.

TABLE 1

| Lens surface data | | | | | |
|---|---|---|---|---|---|
| Surface number | r | d | Nd | vd | ΔPdt |
| 1 | 12.350 | 0.700 | 2.00331 | 28.32 | |
| 2 | 4.241 | 3.389 | | | |
| 3 * | −8.077 | 0.650 | 1.53504 | 55.71 | |
| 4 * | 10.876 | 0.400 | | | |
| 5 | 13.346 | 1.559 | 1.94594 | 17.98 | |
| 6 | −258.962 | D (6) | | | |
| 7 *S | 4.654 | 2.524 | 1.53504 | 55.71 | −0.13 |
| 8 * | −91.497 | 0.150 | | | |
| 9 * | 4.051 | 0.600 | 1.61502 | 25.92 | |
| 10 * | 3.043 | 1.055 | | | |
| 11 | 14.284 | 2.650 | 1.49700 | 81.61 | |
| 12 | −3.573 | 0.500 | 1.84666 | 23.78 | |
| 13 | −6.863 | D (13) | | | |
| 14 * | 20.188 | 1.469 | 1.53504 | 55.71 | |
| 15 * | −100.000 | D (15) | | | |
| 16 | INF | 0.710 | 1.51633 | 64.14 | |
| 17 | INF | 0.500 | | | |
| 18 | INF | | | | |

Table 2 shows various data of the zoom lens of Example 1. In Table 2, "F" represents the focal length of the zoom lens in infinity focus, "FNo" represents the F value, "ω" represents the half angle of view, and "Y" represents the image height.

TABLE 2

| Various data | | |
|---|---|---|
| | Wide angle end | Telephoto end |
| F | 3.1000 | 7.2000 |
| FNo | 2.06 | 3.19 |
| ω | 65.9 | 27.1 |
| Y | 3.4000 | 3.4000 |
| D (6) | 7.9134 | 0.8000 |
| D (13) | 1.0853 | 3.9675 |
| D (15) | 3.0732 | 7.3044 |

Table 3 shows aspherical data of the zoom lens of Example 1. The aspherical shape of an aspherical lens is expressed by the following expression where H is the height perpendicular to the optical axis, X(H) is the amount of displacement in the optical axis direction at the height H with the surface top serving as the origin, R is the paraxial radius of curvature, k is the conical coefficient (conic coefficient), and A, B, C, D, E, F, and G are respectively the 2nd, 4th, 6th, 8th, 10th, 12th, and 14th aspherical coefficients. In Table 3, "E-a" indicates "×10$^{-a}$".

$$X(H) = \frac{H^2/R}{1 + \sqrt{1 - (1+K)(H^2/R^2)}} +$$

$$AH^2 + BH^4 + CH^6 + DH^8 + EH^{10} + FH^{12} + GH^{14}$$

[Formula 1]

TABLE 3

Aspherical data

| | k | A | B | C | D | E |
|---|---|---|---|---|---|---|
| 3 | 0 | 0.00000E+00 | −1.34231E−04 | 2.91731E−05 | −3.175025−06 | 8.79015E−08 |
| 4 | 0 | 0.00000E+00 | −6.55936E−04 | 4.47569E−05 | −4.85539E−06 | 2.043485−07 |
| 7 | 0 | 0.00000E+00 | −4.41251E−05 | 1.01065E−04 | −1.36958E−05 | 1.25568E−06 |
| 8 | 0 | 0.00000E+00 | 2.94274E−03 | 2.43504E−05 | −3.40187E−05 | 4.82792E−06 |
| 9 | 0 | 0.00000E+00 | −3.19738E−03 | 6.71729E−05 | −7.76154E−05 | 7.07428E−06 |
| 10 | 0 | 0.00000E+00 | −6.46741E−03 | 5.99391E−05 | −9.33305E−05 | 5.50843E−06 |
| 14 | 0 | 0.00000E+00 | 5.87296E−04 | −5.94224E−05 | 6.43191E−06 | −2.49953E−07 |
| 15 | 0 | 0.00000E+00 | 7.23970E−04 | −8.82632E−05 | 9.19860E−06 | −3.57017E−07 |

Table 4 shows data of the lens groups of Example 1. Data of the lens groups shows the surface number of the start surface, the surface number of the end surface, and the focal length in each of the lens groups included in the zoom lens.

TABLE 4

Data of lens groups

| Lens group | Start surface-end surface | Focal length |
|---|---|---|
| G1 | 1-6 | −5.10 |
| G2 | 8-13 | 7.94 |
| G3 | 14-15 | 31.53 |

Figure 2:
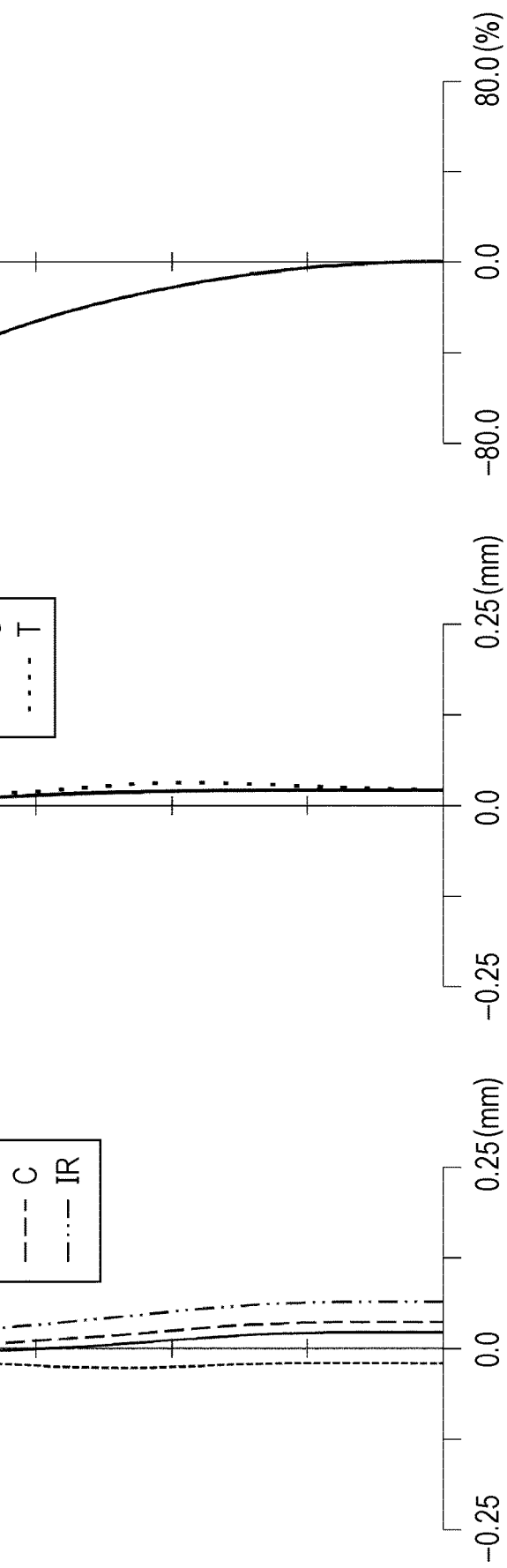
FIG. 2 is a diagram showing longitudinal aberrations at the wide angle end of the zoom lens of Example 1 in infinity focus.
Figure 3:
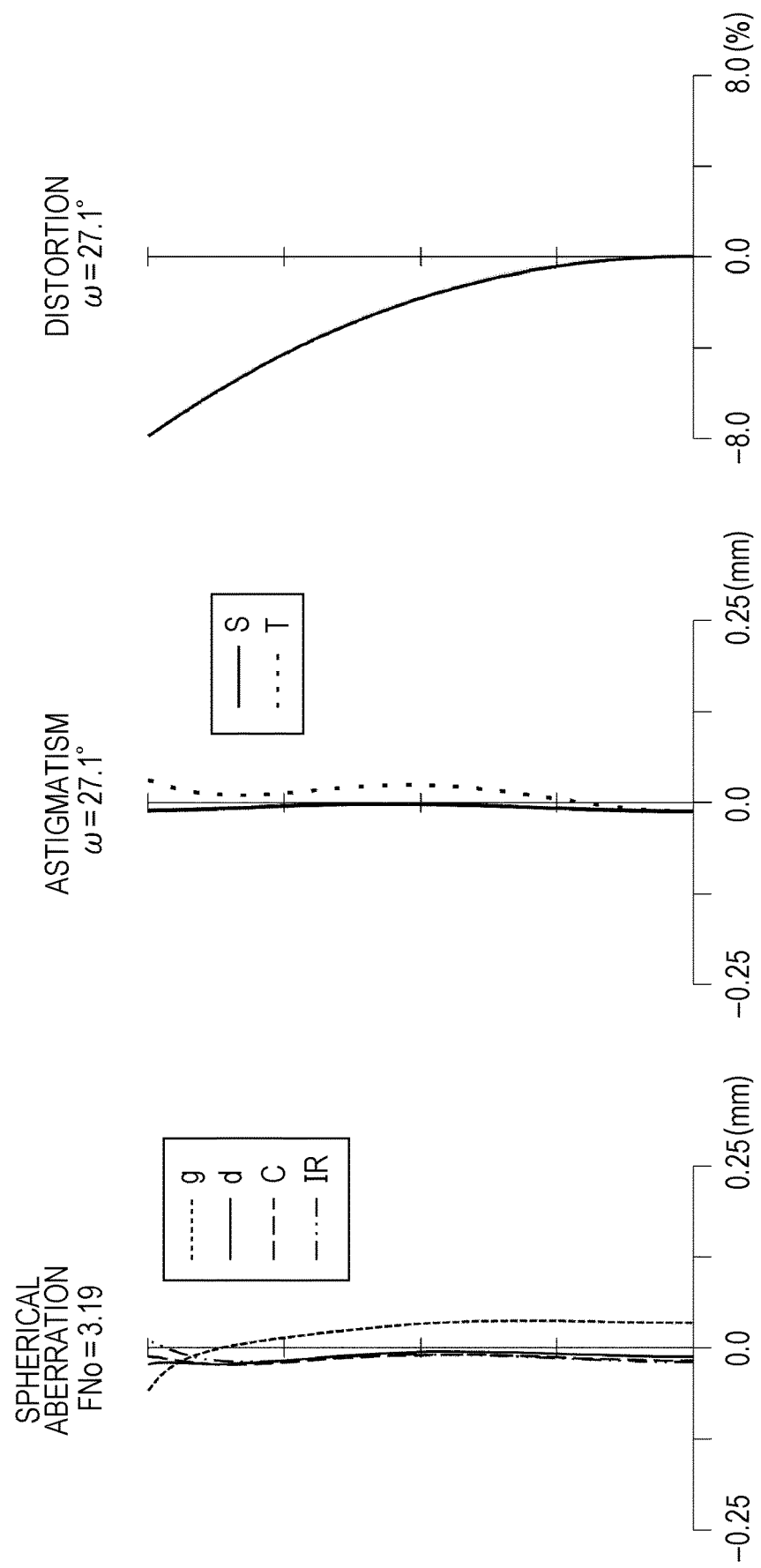
FIG. 3 is a diagram showing longitudinal aberrations at a telephoto end of the zoom lens of Example 1 in infinity focus.

FIG. 2 is a diagram showing longitudinal aberrations at the wide angle end of the zoom lens of Example 1 in infinity focus. FIG. 3 is a diagram showing longitudinal aberrations at the telephoto end of the zoom lens of Example 1 in infinity focus. The longitudinal aberration graphs shown in each figure show spherical aberration (mm), astigmatism (mm), and distortion (%) from the left side of the drawing.

In the graph showing spherical aberration, the vertical axis represents the ratio to the open F number, and the horizontal axis represents defocus. In the graph showing spherical aberration, the dotted line represents longitudinal aberration at the g line (wavelength λ=435.84 nm), the solid line represents longitudinal aberration at the d line (wavelength λ=587.56 nm), the broken line represents longitudinal aberration at the C line (wavelength λ=656.27 nm), and the alternate long and two short dashes line represents longitudinal aberration at the near infrared ray (wavelength λ=850 nm).

In the graph showing astigmatism, the vertical axis represents the image height (mm), and the horizontal axis represents defocus. In the graph showing astigmatism, the solid line represents a sagittal image plane (S) with respect to the d line, and the dotted line shows a meridional image plane (T) with respect to the d line.

In the graph showing distortion, the vertical axis represents the image height (mm), and the horizontal axis represents %.

Example 2

Figure 4:
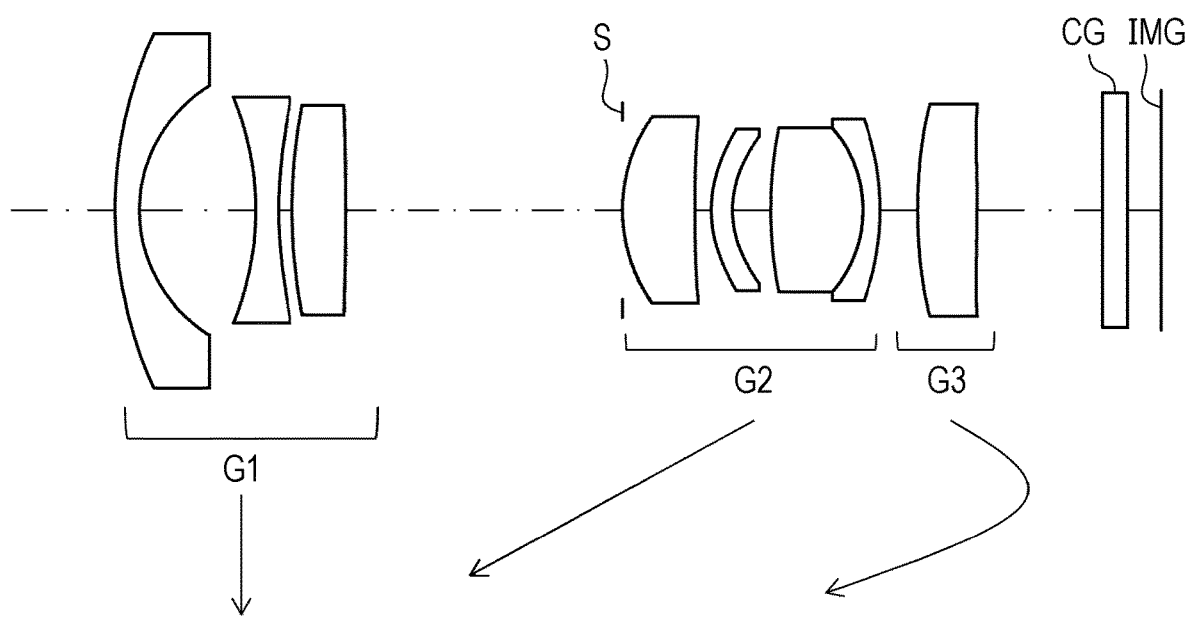
FIG. 4 is a diagram schematically showing an optical configuration at a wide angle end of a zoom lens of Example 2 in infinity focus.

FIG. 4 is a diagram schematically showing an optical configuration at a wide angle end of a zoom lens of Example 2 in infinity focus. The lens of Example 2 includes sequentially from an object side: a first lens group G1 having negative refractive power, a second lens group G2 having positive refractive power, and a third lens group G3 having positive refractive power. A stop S is disposed closest to the object side of the second lens group G2. A cover glass CG is disposed between the third lens group G3 and the image plane IMG. The second lens group G2 includes sequentially from the object side: a lens (lens Lp) having positive refractive power, a lens having negative refractive power, and a cemented lens including a lens having positive refractive power and a lens having negative refractive power.

The zoom lens of Example 2 performs a magnification change operation by changing air gaps between the lens groups. In the figure, the arrows shown below the lens groups indicate the trajectory of the movement of each lens group when moving from the wide angle end to a telephoto end via an intermediate focal length state. During the magnification change from the wide angle end to the telephoto end, the first lens group G1 is fixed in the optical axis direction. The second lens group G2 gradually moves toward the object side. The third lens group G3 moves toward the image side and then toward the object side. More specifically, the magnification change is performed by the second lens group G2 moving toward the object side as described above, whereas correction of the focal position and focusing through the magnification change are performed by the third lens group G3 moving as described above.

Next, an example in which specific numerical values of the zoom lens are applied will be described. Table 5 is a table of surface data of the zoom lens of Example 2. In Table 5, surface numbers 1 to 6 are the surface numbers of the lenses in the first lens group G1, and surface numbers 7 to 13 are the surface numbers of the lenses in the second lens group G2. Surface number 7 represents the stop and the surface of the lens closest to the object side of the second lens group G2. Surface numbers 14 and 15 are the surface numbers of the lenses in the third lens group G3. Surface numbers 16 and 17 represent the cover glass, and surface number 18 represents the image plane.

TABLE 5

Data of lens surface

| Surface number | r | d | Nd | vd | ΔPdt |
|---|---|---|---|---|---|
| 7 | 12.250 | 0.700 | 2.00331 | 28.32 | |
| 2 | 4.199 | 3.330 | | | |
| 3 * | −8.333 | 0.650 | 1.53504 | 55.71 | |
| 4 * | 12.465 | 0.400 | | | |

TABLE 5-continued

Data of lens surface

| Surface number | r | d | Nd | vd | ΔPdt |
|---|---|---|---|---|---|
| 5 | 15.505 | 1.549 | 1.94594 | 17.98 | |
| 6 | −80.179 | D (6) | | | |
| 7 *S | 4.651 | 2.076 | 1.53504 | 55.71 | −0.13 |
| 8 * | 60.136 | 0.481 | | | |
| 9 * | 3.741 | 0.600 | 1.61502 | 25.92 | |
| 10 * | 3.046 | 1.088 | | | |
| 11 | 12.248 | 2.654 | 1.49700 | 81.61 | |
| 12 | −3.618 | 0.500 | 1.84666 | 23.78 | |
| 13 | −7.635 | D (13) | | | |
| 14 * | 15.838 | 1.690 | 1.53504 | 55.71 | |
| 15 * | −100.000 | D (15) | | | |
| 16 | INF | 0.210 | 1.51633 | 64.14 | |
| 17 | INF | 0.500 | | | |
| 18 | INF | | | | |

Table 6 shows various data of the zoom lens of Example 2. Table 7 shows aspherical data of the zoom lens of Example 2. Table 8 shows data of the lens groups of Example 2.

TABLE 6

Various data

| | Wide angle end | Telephoto end |
|---|---|---|
| F | 3.1000 | 7.2000 |
| FNo | 2.04 | 3.13 |
| ω | 64.0 | 27.2 |
| Y | 3.4000 | 3.4000 |
| D (6) | 7.6572 | 0.8000 |
| D (13) | 1.1693 | 3.1536 |
| D (15) | 3.3182 | 8.1910 |

TABLE 7

Aspherical data

| | k | A | B | C | D | E |
|---|---|---|---|---|---|---|
| 3 | 0 | 0.00000E+00 | 1.58546E−06 | 2.12431E−05 | −2.21358E−06 | 5.58826E−08 |
| 4 | 0 | 0.00000E+00 | −6.15279E−04 | 2.20357E−05 | −2.39687E−06 | 8.47808E−08 |
| 7 | 0 | 0.00000E+00 | −2.19822E−04 | 1.00377E−04 | −1.54857E−05 | 1.31761E−06 |
| 8 | 0 | 0.00000E+00 | 8.32574E−04 | 1.60018E−04 | −3.42808E−05 | 3.26649E−06 |
| 9 | 0 | 0.00000E+00 | −1.76222E−03 | −1.54167E−04 | −5.34051E−05 | 4.11036E−06 |
| 10 | 0 | 0.00000E+00 | −2.17085E−03 | −3.53127E−04 | −6.23940E−05 | 3.58417E−06 |
| 14 | 0 | 0.00000E+00 | 5.68322E−04 | −5.03466E−05 | 6.81135E−06 | −1.88190E−07 |
| 15 | 0 | 0.00000E+00 | 7.12204E−04 | −6.45281E−05 | 7.26635E−06 | −1.62313E−07 |

TABLE 8

Data of lens groups

| Lens group | Start surface- end surface | Focal length |
|---|---|---|
| G1 | 1-6 | −5.36 |
| G2 | 8-13 | 8.13 |
| G3 | 14-15 | 25.68 |

Figure 5:
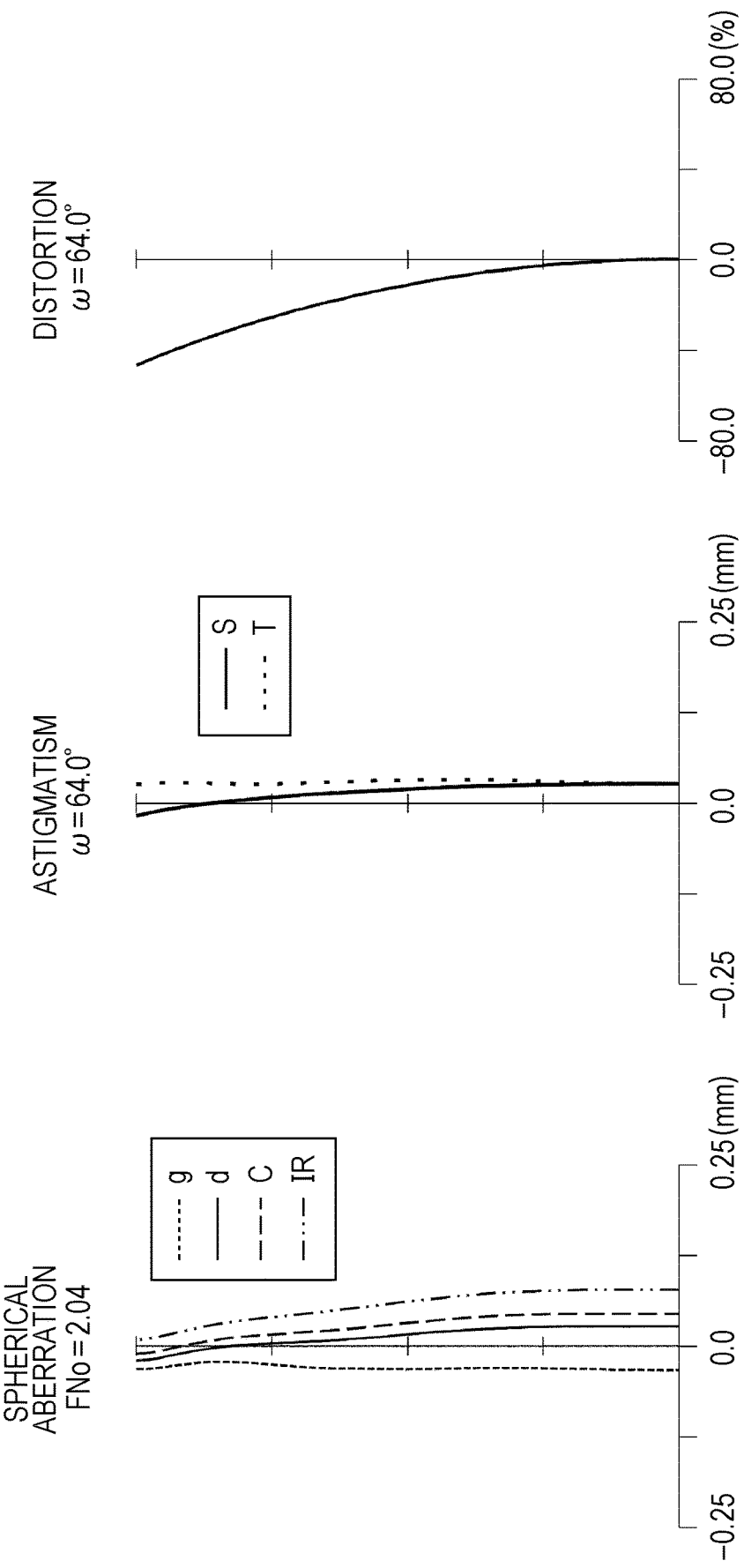
FIG. 5 is a diagram showing longitudinal aberrations at the wide angle end of the zoom lens of Example 2 in infinity focus.
Figure 6:
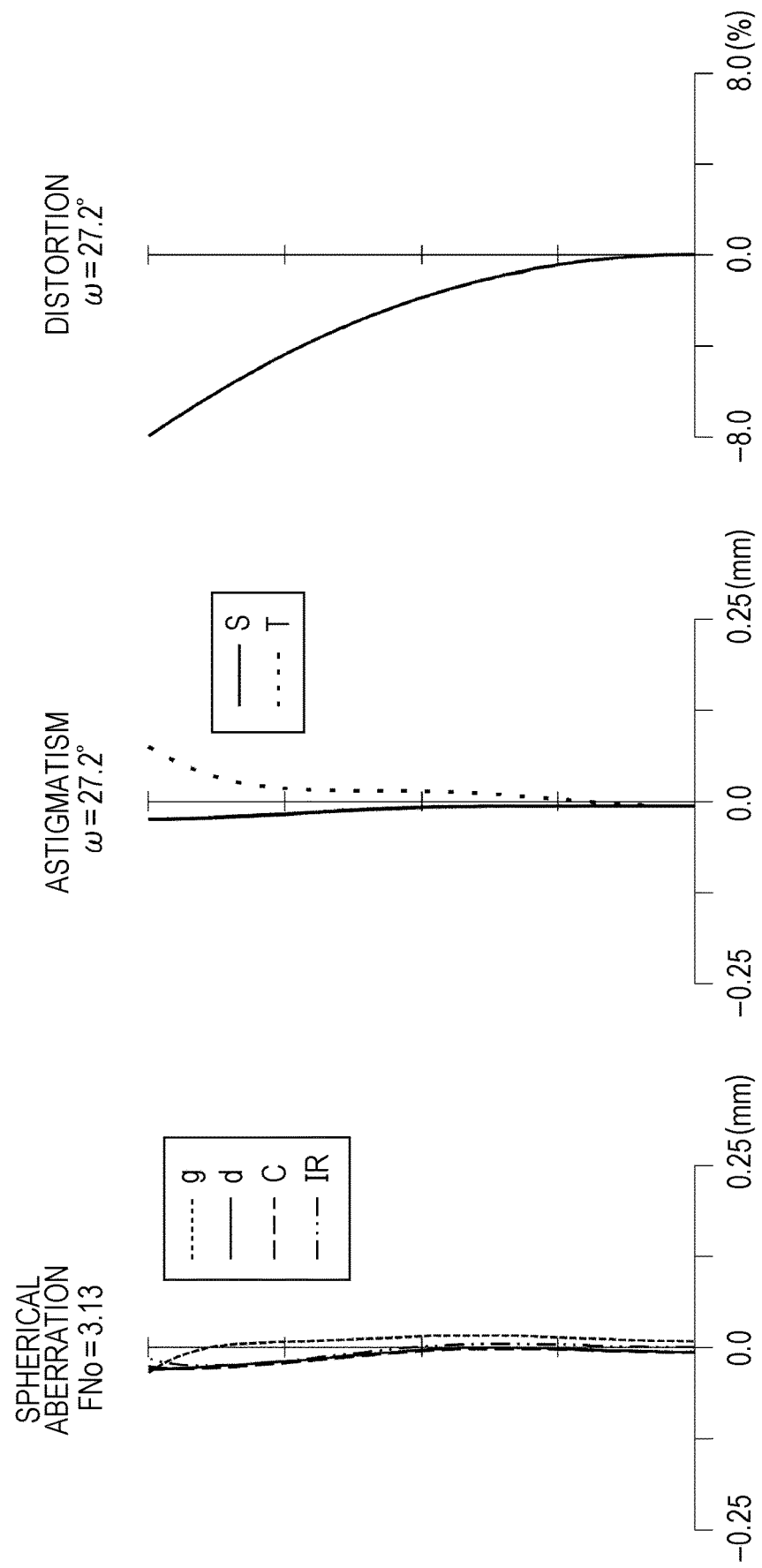
FIG. 6 is a diagram showing longitudinal aberrations at a telephoto end of the zoom lens of Example 2 in infinity focus.

FIG. 5 is a diagram showing longitudinal aberrations at the wide angle end of the zoom lens of Example 2 in infinity focus. FIG. 6 is a diagram showing longitudinal aberrations at the telephoto end of the zoom lens of Example 2 in infinity focus.

Example 3

Figure 7:
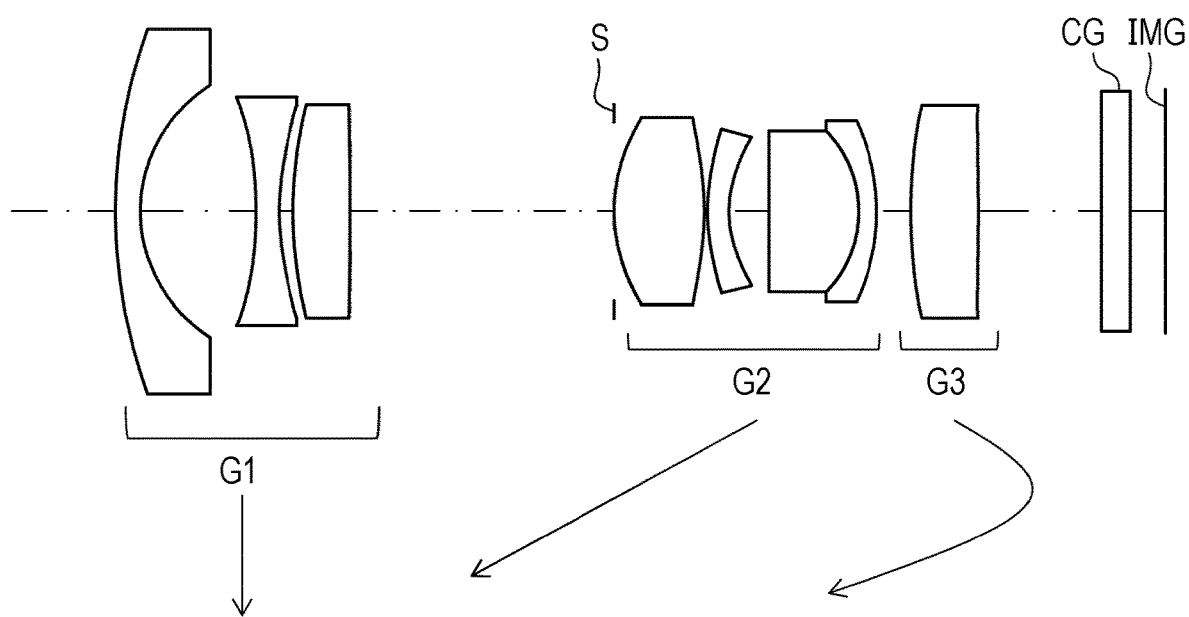
FIG. 7 is a diagram schematically showing an optical configuration at a wide angle end of a zoom lens of Example 3 in infinity focus.

FIG. 7 is a diagram schematically showing an optical configuration at a wide angle end of a zoom lens of Example 3 in infinity focus. The lens of Example 3 includes sequentially from an object side: a first lens group G1 having negative refractive power, a second lens group G2 having positive refractive power, and a third lens group G3 having positive refractive power. A stop S is disposed closest to the object side of the second lens group G2.

A cover glass CG is disposed between the third lens group G3 and the image plane IMG. The second lens group G2 includes sequentially from the object side: a lens (lens Lp) having positive refractive power, a lens having negative refractive power, and a cemented lens including a lens having positive refractive power and a lens having negative refractive power.

The zoom lens of Example 3 performs a magnification change operation by changing air gaps between the lens groups. In the figure, the arrows shown below the lens groups indicate the trajectory of the movement of each lens group when moving from the wide angle end to a telephoto end via an intermediate focal length state. During the magnification change from the wide angle end to the telephoto end, the first lens group G1 is fixed in the optical axis direction. The second lens group G2 gradually moves toward the object side. The third lens group G3 moves toward the image side and then toward the object side. More specifically, the magnification change is performed by the second lens group G2 moving toward the object side as described above, whereas correction of the focal position and focusing through the magnification change are performed by the third lens group G3 moving as described above.

Next, an example in which specific numerical values of the Zoom lens are applied will be described. Table 9 is a table of surface data of the zoom lens of Example 3. In Table 9, surface numbers 1 to 6 are the surface numbers of the lenses in the first lens group G1, and surface numbers 7 to 13 are the surface numbers of the lenses in the second lens group G2. Surface number 7 represents the stop and the surface of the lens closest to the object side of the second lens group G2. Surface numbers 14 and 15 are the surface numbers of the lenses in the third lens group G3. Surface numbers 16 and 17 represent the cover glass, and surface number 18 represents the image plane.

TABLE 9

Lens surfaces data

| Surface number | r | d | Nd | vd | ΔPdt |
|---|---|---|---|---|---|
| 1 | 14.860 | 0.700 | 2.00331 | 28.32 | |
| 2 | 4.180 | 3.240 | | | |
| 3 * | −14.033 | 0.650 | 1.53504 | 55.71 | |
| 4 * | 6.788 | 0.400 | | | |
| 5 | 12.120 | 1.610 | 1.94594 | 17.98 | |
| 6 | −149.900 | D (6) | | | |
| 7 *S | 4.635 | 2.520 | 1.53504 | 55.71 | −0.13 |
| 8 * | −7.846 | 0.100 | | | |
| 9 * | 5.286 | 0.600 | 1.61609 | 25.79 | |
| 10 * | 2.944 | 1.120 | | | |
| 11 | −1075.300 | 2.520 | 1.49700 | 81.61 | |
| 12 | −3.250 | 0.500 | 1.85478 | 24.80 | |
| 13 | −6.000 | D (13) | | | |
| 14 * | 16.590 | 1.900 | 1.53504 | 55.71 | |
| 15 * | −80.000 | D (15) | | | |
| 16 | INF | 0.800 | 1.51633 | 64.14 | |
| 17 | INF | 1.519 | | | |
| 18 | INF | | | | |

Table 10 shows various data of the zoom lens of Example 3. Table 11 shows aspherical data of the zoom lens of Example 3. Table 12 shows data of the lens groups of Example 3.

TABLE 10

Various data

| | Wide angle end | Telephoto end |
|---|---|---|
| F | 3.0000 | 6.9690 |
| FNo | 2.0719 | 3.1174 |
| ω | 68.0 | 28.1 |
| Y | 3.400 | 3.400 |
| D (6) | 7.402 | 0.603 |
| D (13) | 0.963 | 2.6312 |
| D (15) | 2.938 | 8.070 |

TABLE 11

Aspherical data

| | k | A | B | C | D | E |
|---|---|---|---|---|---|---|
| 3 | 0 | 0.00000E+00 | −4.40682e−03 | 5.89606e−04 | −4.50110e−05 | 1.37059e−06 |
| 4 | 0 | 0.00000E+00 | −5.26205e−03 | 6.36316e−04 | −5.12937e−05 | 1.68395e−06 |
| 7 | 0 | 0.00000E+00 | −5.45898e−04 | −5.52899e−05 | −3.32593e−06 | 2.15720e−07 |
| 8 | 0 | 0.00000E+00 | 4.21906e−03 | −3.69892e−04 | 2.40970e−05 | −5.05537e−07 |
| 9 | 0 | 0.00000E+00 | −1.09461e−02 | 1.65307e−03 | −1.44489e−04 | 7.34208e−06 |
| 10 | 0 | 0.00000E+00 | −1.86790e−02 | 2.42790e−03 | −2.73409e−04 | 1.19781e−05 |
| 14 | 0 | 0.00000E+00 | 5.03710e−04 | −3.36589e−05 | 5.61529e−06 | −1.49835e−07 |
| 15 | 0 | 0.00000E+00 | 5.10712e−04 | −4.51321e−05 | 6.1758le−06 | −1.39098e−07 |

TABLE 12

Data of lens groups

| Lens group | Start surface-end surface | Focal length |
|---|---|---|
| G1 | 1-6 | −4.9356 |
| G2 | 7-13 | 7.7848 |
| G3 | 14-15 | 20.6753 |

Figure 8:
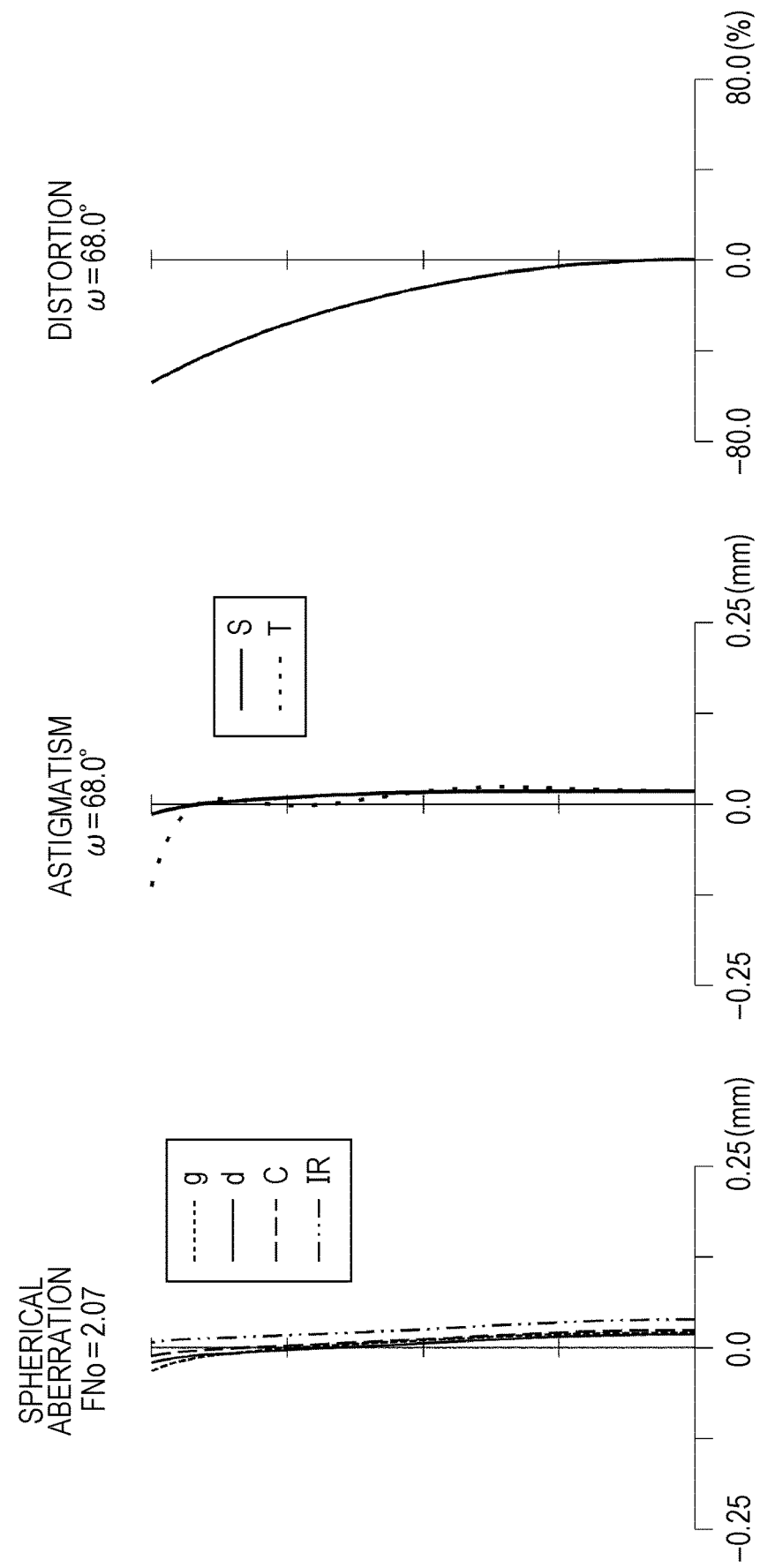
FIG. 8 is a diagram showing longitudinal aberrations at the wide angle end of the zoom lens of Example 3 in infinity focus.
Figure 9:
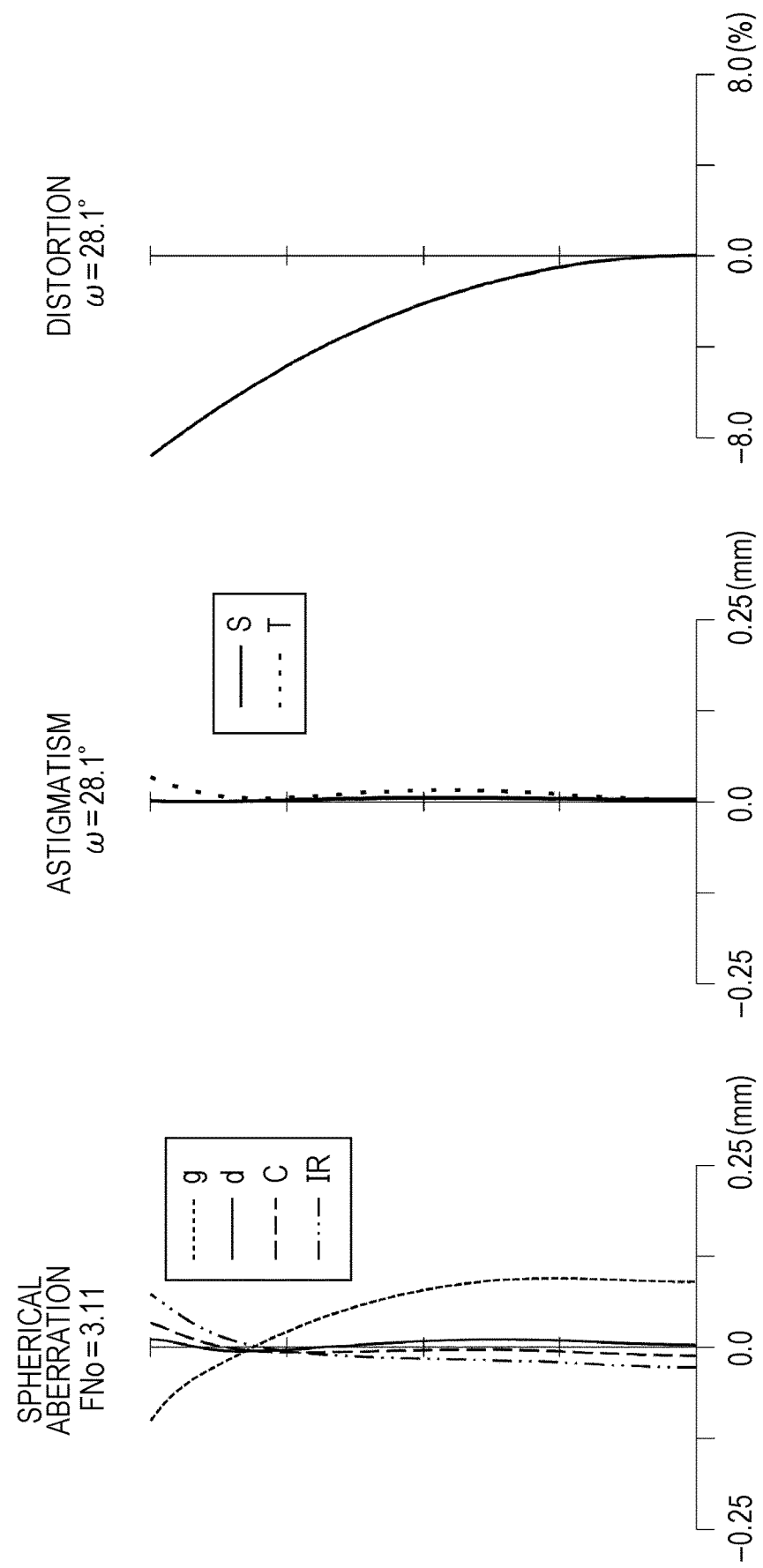
FIG. 9 is a diagram showing longitudinal aberrations at a telephoto end of the zoom lens of Example 3 in infinity focus.

FIG. 8 is a diagram showing longitudinal aberrations at the wide angle end of the zoom lens of Example 3 in infinity focus. FIG. 9 is a diagram showing longitudinal aberrations at the telephoto end of the zoom lens of Example 3 in infinity focus.

Example 4

Figure 10:
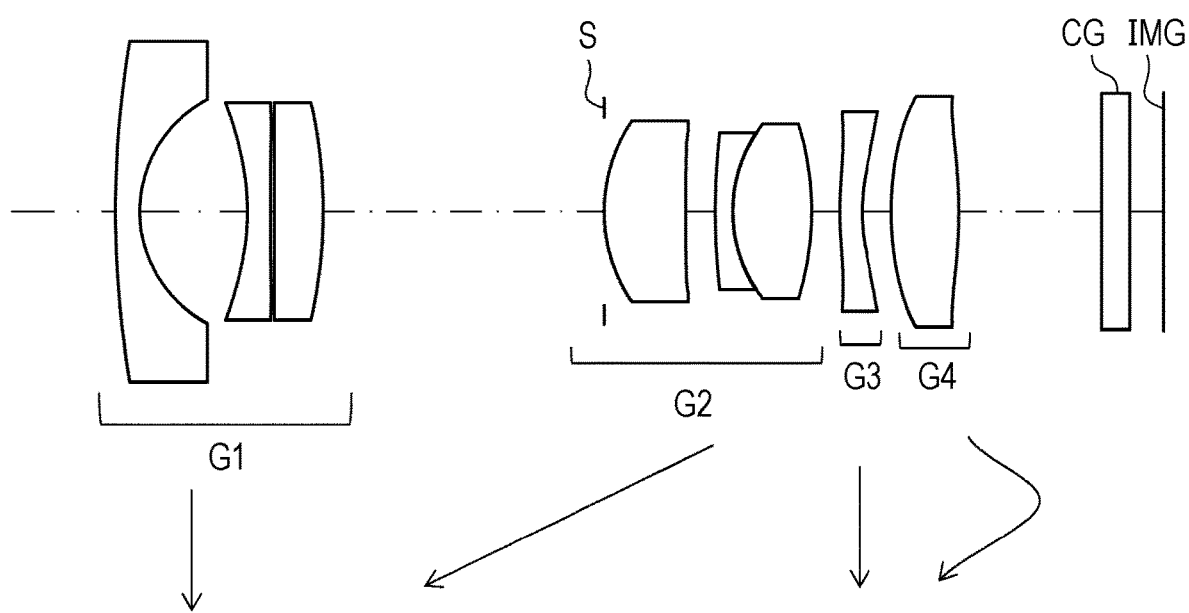
FIG. 10 is a diagram schematically showing an optical configuration at a wide angle end of a zoom lens of Example 4 in infinity focus.

FIG. 10 is a diagram schematically showing an optical configuration at a wide angle end of a zoom lens of Example 4 in infinity focus. The lens of Example 4 includes sequentially from an object side: a first lens group G1 having negative refractive power, a second lens group G2 having positive refractive power, a third lens group G3 having negative refractive power, and a fourth lens group G4 having positive refractive power. A stop S is disposed between the first lens group G1 and the second lens group G2. A cover glass CG is disposed between the fourth lens group G4 and the image plane IMG. The second lens group G2 includes sequentially from the object side: a lens (lens Lp) having positive refractive power, and a cemented lens including a lens having negative refractive power and a lens having positive refractive power.

The zoom lens of Example 4 performs a magnification change operation by changing air gaps between the lens groups. In the figure, the arrows shown below the lens groups indicate the trajectory of the movement of each lens group when moving from the wide angle end to a telephoto end via an intermediate focal length state. During the magnification change from the wide angle end to the telephoto end, the first lens group G1 and the third lens group G3 are each fixed in the optical axis direction. The second lens group G2 gradually moves toward the object side. The fourth lens group G4 moves toward the image side and then toward the object side. More specifically, the magnification change is performed by the second lens group G2 moving toward the object side as described above, whereas correction of the focal position and focusing through the magnification change are performed by the fourth lens group G4 moving as described above.

Next, an example in which specific numerical values of the Zoom lens are applied will be described. Table 13 is a table of surface data of the zoom lens of Example 4. In Table 13, surface numbers 1 to 6 are the surface numbers of the lenses in the first lens group G1, and surface number 7 represents a stop. Surface numbers 8 to 12 are the surface numbers of the lenses in the second lens group G2, and surface numbers 13 and 14 are the surface numbers of the lenses in the third lens group G3. Surface numbers 15 and 16 are the surface numbers of the lenses in the fourth lens group G4. Surface numbers 17 and 18 represent the cover glass, and surface number 19 represents the image plane.

TABLE 13

Lens surface data

| Surface number | r | d | Nd | vd | ΔPdt |
|---|---|---|---|---|---|
| 1 | 28.7288 | 0.7000 | 1.81600 | 46.62 | |
| 2 | 3.6548 | 3.0828 | | | |
| 3 * | −6.7640 | 0.6500 | 1.53504 | 55.71 | |
| 4 * | 160.3017 | 0.1000 | | | |
| 5 | 512.8509 | 1.4251 | 2.05090 | 26.94 | |
| 6 | −13.7091 | D (6) | | | |
| 7 S | INF | 0.0000 | | | |
| 8 * | 4.8414 | 2.3189 | 1.53504 | 55.71 | −0.13 |
| 9 * | −515.0198 | 0.8417 | | | |
| 10 | 20.3251 | 0.5000 | 1.80610 | 33.27 | |
| 11 | 4.1131 | 2.2610 | 1.49700 | 81.61 | |
| 12 | −8.4852 | D (12) | | | |
| 13 * | 10.0044 | 0.6500 | 1.61502 | 25.92 | |
| 14 * | 5.1192 | D (14) | | | |
| 15 * | 10.0366 | 1.9189 | 1.53504 | 55.71 | |
| 16 * | −13.6427 | D (16) | | | |
| 17 | INF | 0.8000 | 1.51680 | 64.20 | |
| 18 | INF | 1.0000 | | | |
| 19 | INF | | | | |

Table 14 shows various data of the zoom lens of Example 4. Table 15 shows aspherical data of the zoom lens of Example 4. Table 16 shows data of the lens groups of Example 4.

TABLE 14

Various data

| | Wide angle end | Telephoto end |
|---|---|---|
| F | 3.0996 | 7.2852 |
| FNo | 2.0905 | 3.3754 |
| ω | 65.5 | 26.6 |
| Y | 3.400 | 3.400 |
| D (6) | 8.041 | 0.800 |
| D (12) | 0.800 | 8.041 |
| D (14) | 0.843 | 1.008 |
| D (16) | 4.068 | 3.904 |

TABLE 15

Aspherical data

| | K | A | B | C | D | E | F |
|---|---|---|---|---|---|---|---|
| 3 | 0 | 0.00000E+00 | 2.09852E−03 | −1.12117E−04 | 6.19566E−06 | −3.38648E−07 | 0.0000 |
| 4 | 0 | 0.00000E+00 | 7.66920E−04 | −1.29823E−04 | 4.22390E−06 | −2.71689E−07 | 0.0000 |
| 8 | 0 | 0.00000E+00 | 1.71166E−04 | 1.43209E−05 | 3.93553E−06 | 2.89822E−07 | 0.0000 |
| 9 | 0 | 0.00000E+00 | 2.01095E−03 | 5.58543E−05 | 5.11174E−06 | 1.12287E−06 | 0.0000 |
| 13 | 0 | 0.00000E+00 | −8.27965E−03 | 3.88510E−04 | −6.93969E−06 | 1.69010E−06 | −1.20734E−07 |
| 14 | 0 | 0.00000E+00 | −9.42997E−03 | 3.78581E−04 | 6.12397E−06 | −1.15356E−06 | 3.03454E−08 |
| 15 | 0 | 0.00000E+00 | 1.06850E−03 | −4.86426E−05 | 8.37252E−06 | −3.42279E−07 | 9.51494E−09 |
| 16 | 0 | 0.00000E+00 | 1.06103E−03 | 5.48638E−05 | 3.00157E−07 | 1.30003E−07 | 0.00000E+00 |

TABLE 16

Data of lens groups

| Lens group | Start surface-end surface | Focal length |
|---|---|---|
| G1 | 1-6 | −5.9306 |
| G2 | 8-12 | 8.2438 |
| G3 | 13-14 | −17.956 |
| G4 | 15-16 | 11.122 |

Figure 11:
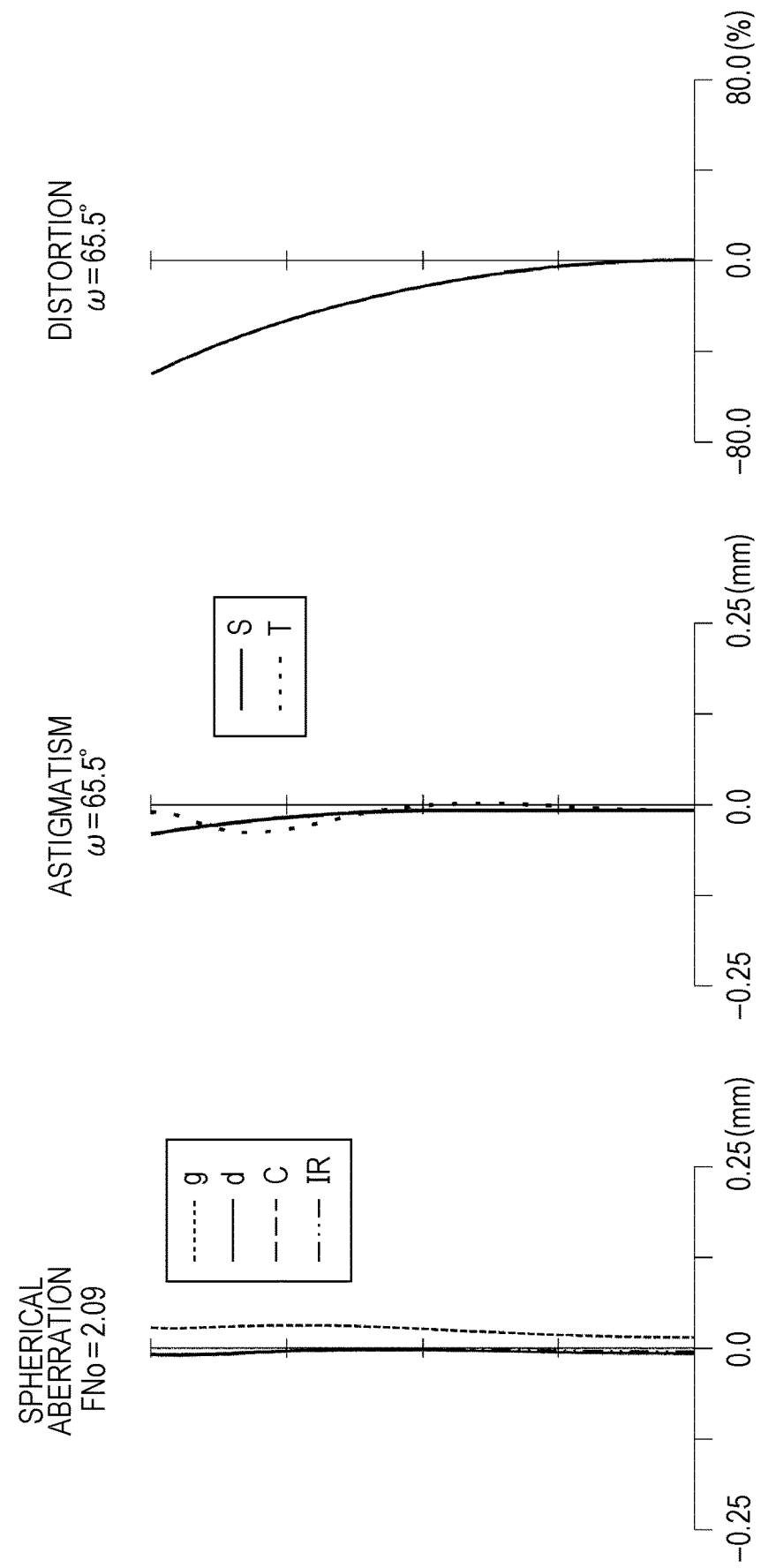
FIG. 11 is a diagram showing longitudinal aberrations at the wide angle end of the zoom lens of Example 4 in infinity focus.
Figure 12:
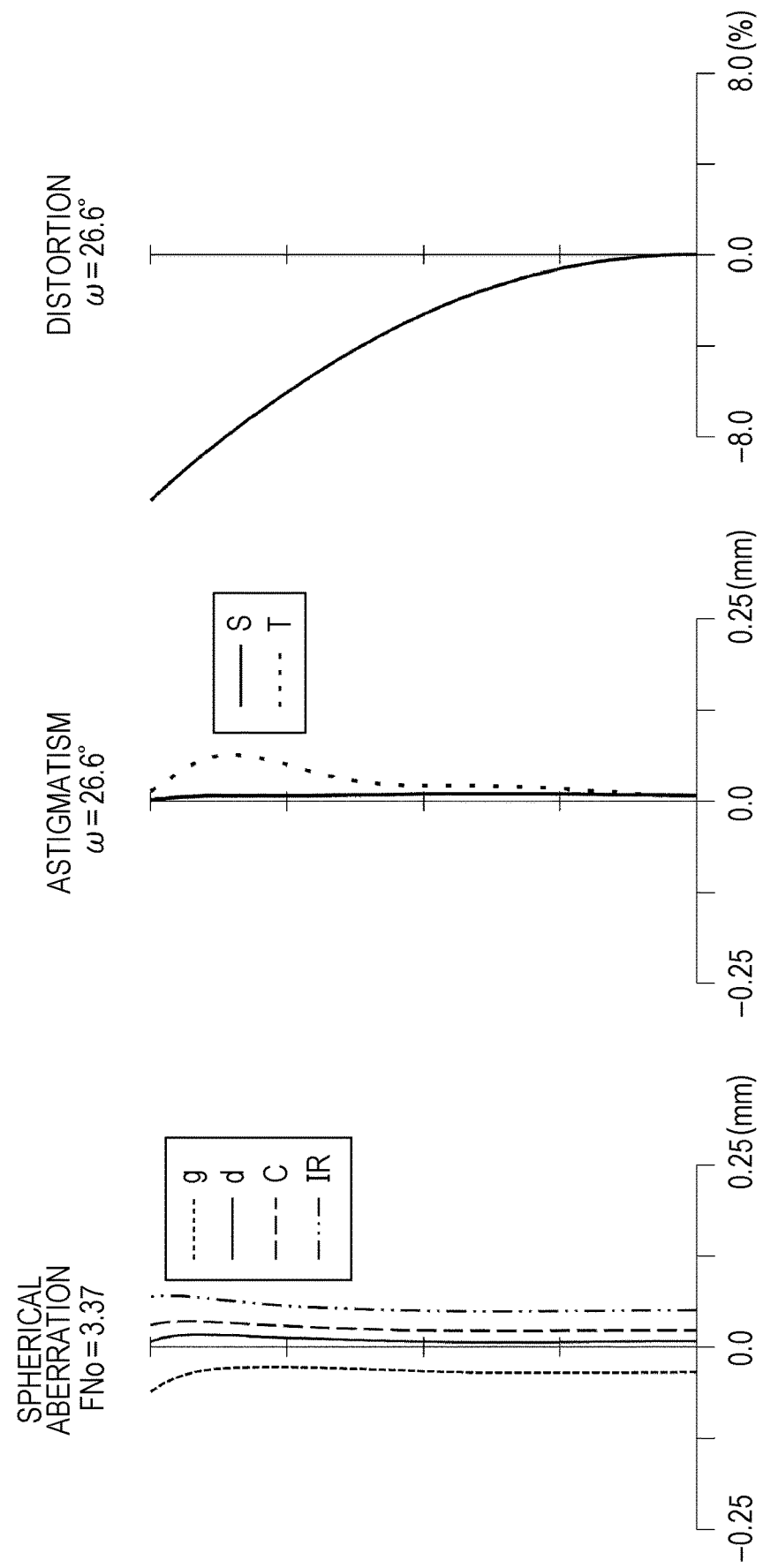
FIG. 12 is a diagram showing longitudinal aberrations at a telephoto end of the zoom lens of Example 4 in infinity focus.

FIG. 11 is a diagram showing longitudinal aberrations at the wide angle end of the zoom lens of Example 4 in infinity focus. FIG. 12 is a diagram showing longitudinal aberrations at the telephoto end of the zoom lens of Example 4 in infinity focus.

Example 5

Figure 13:
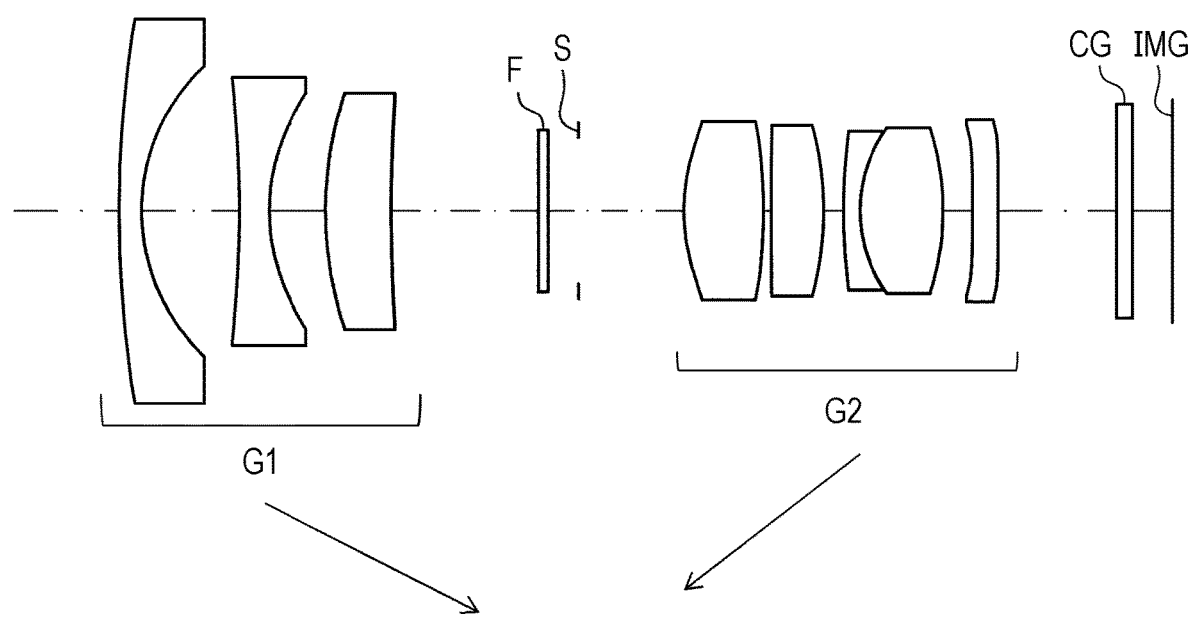
FIG. 13 is a diagram schematically showing an optical configuration at a wide angle end of a zoom lens of Example 5 in infinity focus.

FIG. 13 is a diagram schematically showing an optical configuration at a wide angle end of a zoom lens of Example 5 in infinity focus. The lens of Example 5 includes sequentially from an object side: a first lens group G1 having negative refractive power and a second lens group G2 having positive refractive power. A filter F and a stop S are disposed between the first lens group G1 and the second lens group G2 in this order from the object side. A cover glass CG is disposed between the second lens group G2 and the image plane IMG. The second lens group G2 includes sequentially from the object side: a lens having positive refractive power, a lens having positive refractive power, a cemented lens including a lens having negative refractive power and a lens having positive refractive power, and a lens having negative refractive power.

The zoom lens of Example 5 performs a magnification change operation by changing air gaps between the lens groups. In the figure, the arrows shown below the lens groups indicate the trajectory of the movement of each lens group when moving from the wide angle end to a telephoto end via an intermediate focal length state. During the magnification change from the wide angle end to the telephoto end, the first lens group G1 gradually moves toward the image side, and the second lens group G2 gradually moves toward the object side. More specifically, the magnification change is performed by the second lens group G2 moving toward the object side, whereas correction of the focal position and focusing through the magnification change are performed by the first lens group G1 moving toward the image side.

Next, an example in which specific numerical values of the Zoom lens are applied will be described. Table 17 is a table of surface data of the zoom lens of Example 5. In Table 17, surface numbers 1 to 6 are the surface numbers of the lenses in the first lens group G1. Surface number 7 represents the filter, and surface number 8 represents the stop. Surface numbers 9 to 17 are the surface numbers of the lenses in the second lens group G2. Surface numbers 18 and 19 represent the cover glass, and surface number 20 represents the image plane.

TABLE 17

Lens surface data

| Surface number | r | d | Nd | vd | ΔPdt |
|---|---|---|---|---|---|
| 1 | 35.696 | 0.700 | 2.00100 | 29.13 | |
| 2 | 6.152 | 3.014 | | | |
| 3 * | −24.723 | 0.900 | 1.53504 | 55.71 | |
| 4 * | 6.093 | 1.760 | | | |
| 5 | 11.524 | 2.000 | 1.94594 | 17.98 | |
| 6 | 51.621 | D (6) | | | |
| 7 | INF | 0.300 | 1.51633 | 64.14 | |
| 8 S | INF | D (8) | | | |
| 9 * | 5.904 | 2.450 | 1.53504 | 55.71 | −0.13 |
| 10 * | −16.626 | 0.236 | | | |
| 11 | 233.454 | 1.611 | 1.59410 | 60.47 | |
| 12 | −10.428 | 0.625 | | | |
| 13 | 19.164 | 0.500 | 2.05090 | 26.94 | |
| 14 | 4.260 | 2.573 | 1.43875 | 94.94 | |
| 15 | −8.343 | 0.897 | | | |
| 16 * | −21.526 | 0.800 | 1.66134 | 20.37 | |
| 17 * | −29.225 | D (17) | | | |
| 18 | INF | 0.500 | 1.51633 | 64.14 | |
| 19 | INF | 1.261 | | | |
| 20 | INF | | | | |

Table 18 shows various data of the zoom lens of Example 5. Table 19 shows aspherical data of the zoom lens of Example 5. Table 20 shows data of the lens groups of Example 5.

TABLE 18

Various data

| | Wide angle end | Telephoto end |
|---|---|---|
| F | 3.0000 | 4.9000 |
| FNo | 2.09 | 2.80 |
| ω | 66.2 | 39.4 |
| Y | 3.4000 | 3.4000 |
| D (6) | 4.5295 | 1.1163 |
| D (13) | 4.1832 | 1.7451 |
| D (15) | 3.6063 | 6.0444 |

TABLE 19

Aspherical data

| | K | A | B | C | D | E | F | G |
|---|---|---|---|---|---|---|---|---|
| 3 | 0 | 0 | 1.1263E−03 | −1.1341E−04 | 9.7131E−06 | −6.1381E−07 | 2.1466E−08 | −2.8184E−10 |
| 4 | 0 | 0 | 5.7411E−04 | −1.1790E−04 | 6.7282E−06 | −4.3216E−07 | 1.4355E−08 | 0 |
| 9 | −0.225 | 0 | −1.1925E−03 | −6.0917E−05 | −2.42055E−06 | −2.6262E−07 | 0 | 0 |
| 10 | 0 | 0 | 5.4192E−04 | −1.5390E−04 | 1.2005E−05 | −1.4455E−06 | 5.1604E−08 | 0 |
| 16 | 0 | 0 | −1.2940E−03 | −6.4612E−04 | 1.1512E−04 | −1.6375E−05 | 8.1410E−07 | 8.4375E−10 |
| 17 | 0 | 0 | −1.0477E−03 | −4.7836E−04 | 6.7308E−05 | −8.3812E−06 | 4.2332E−07 | 2.3180E−10 |

TABLE 20

Data of lens groups

| Lens group | Start surface-end surface | Focal length |
|---|---|---|
| G1 | 1-6 | −5.9383 |
| G2 | 9-17 | 7.6234 |

Figure 14:
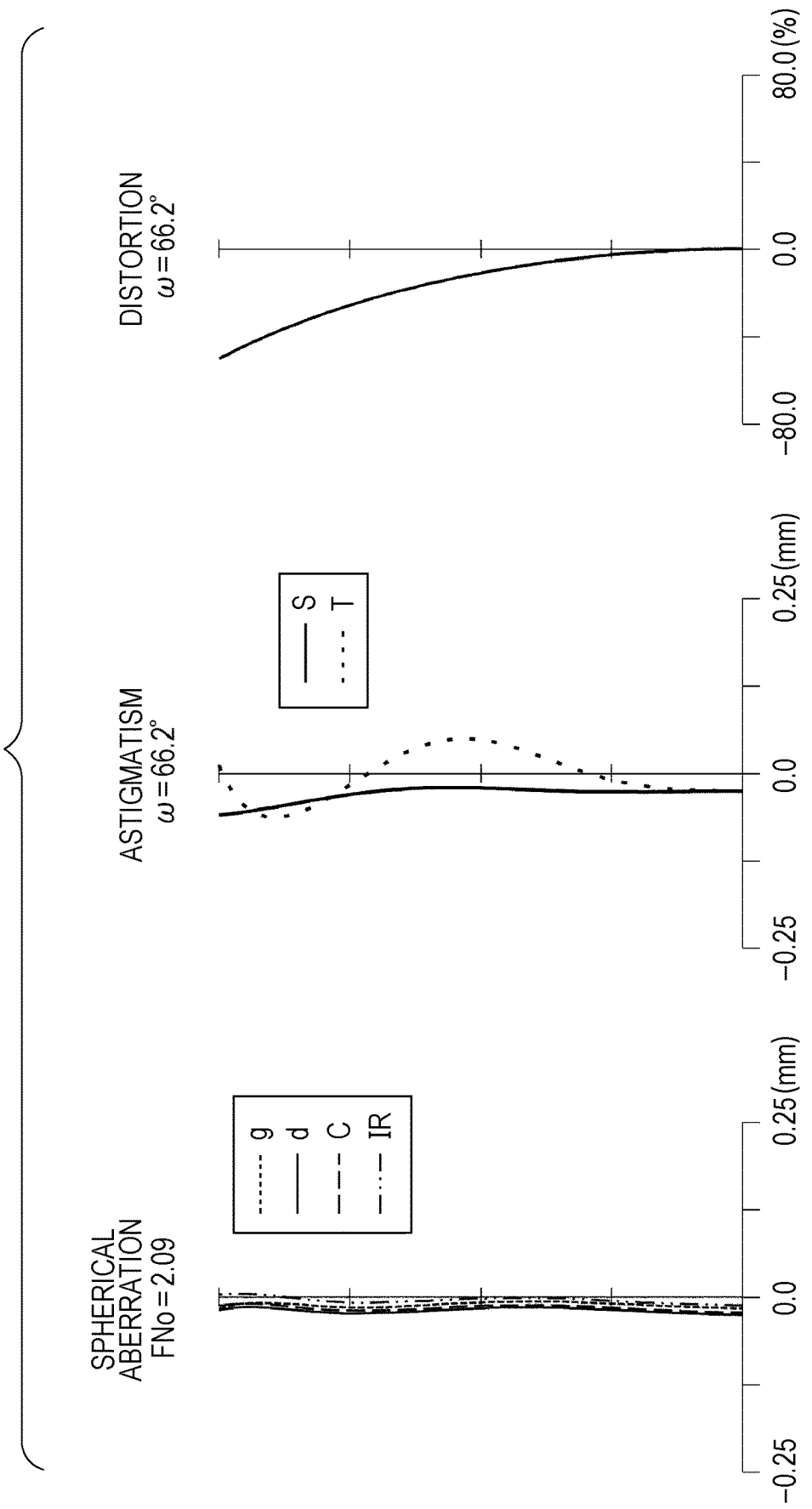
FIG. 14 is a diagram showing longitudinal aberrations at the wide angle end of the zoom lens of Example 5 in infinity focus.
Figure 15:
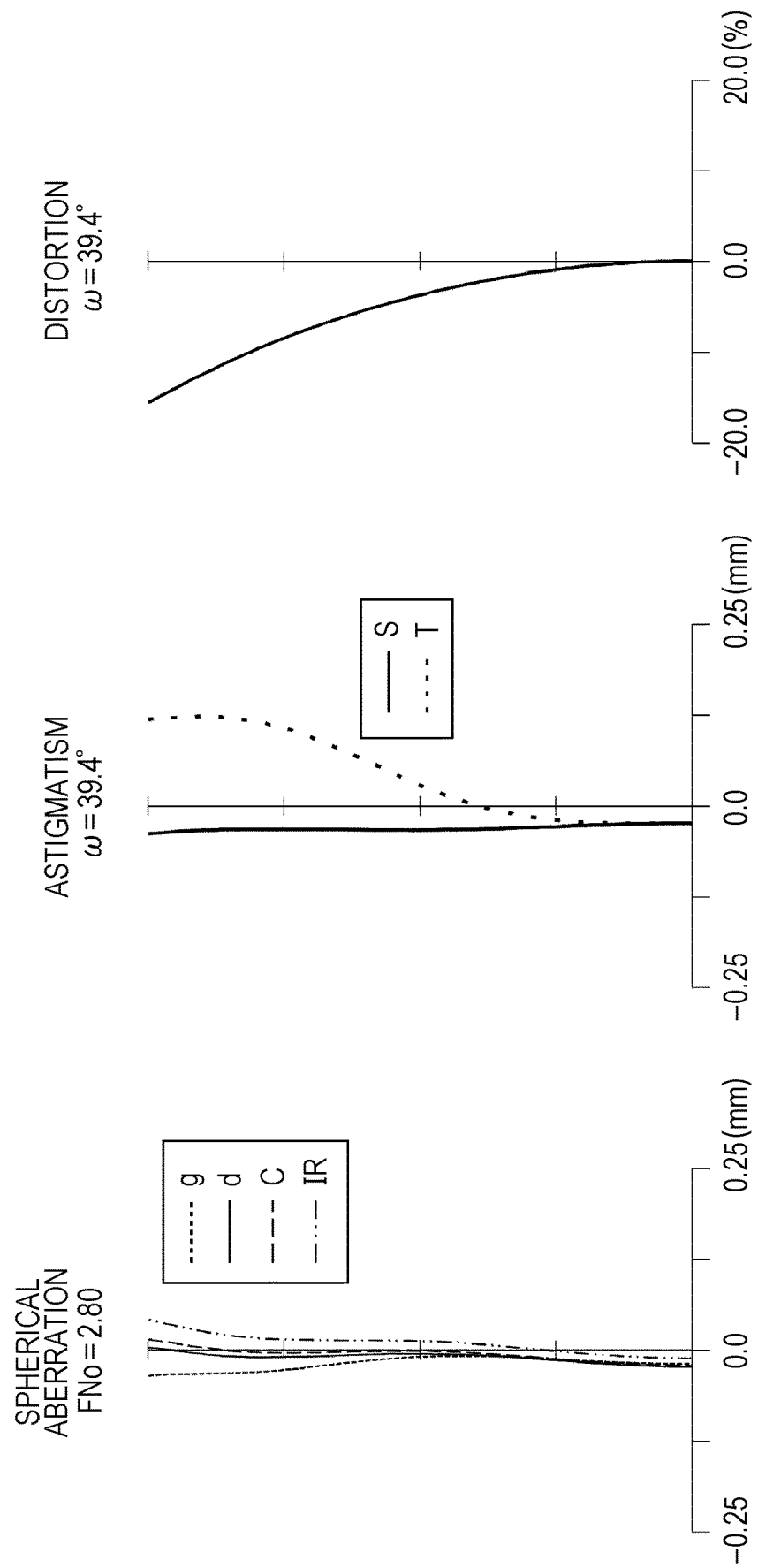
FIG. 15 is a diagram showing longitudinal aberrations at a telephoto end of the zoom lens of Example 5 in infinity focus.

FIG. 14 is a diagram showing longitudinal aberrations at the wide angle end of the zoom lens of Example 5 in infinity focus. FIG. 15 is a diagram showing longitudinal aberrations at the telephoto end of the zoom lens of Example 5 in infinity focus.

Table 21 shows values calculated by the above-mentioned expressions in Examples 1 to 5.

TABLE 21

Table of calculated values

| | Example 1 | Example 2 | Example 3 | Example 4 | Example 5 |
|---|---|---|---|---|---|
| $f_2/f_{2p}$ | 0.95 | 0.87 | 1.39 | 0.92 | 0.90 |
| $f_2/f_w$ | 2.56 | 2.62 | 2.59 | 2.66 | 2.54 |
| $\Delta Pdt\_2p$ | −0.13 | −0.13 | −0.13 | −0.13 | −0.13 |
| $Nd_2$ | 1.54 | 1.54 | 1.54 | 1.54 | 1.54 |
| $f_{2p}/f_w$ | 2.69 | 3.00 | 1.86 | 2.90 | 2.82 |
| $\beta_{2t}/\beta_{2w}$ | 2.87 | 2.95 | 3.58 | 2.32 | 1.63 |
| $|f_s/R_s|$ | 4.62 | 5.00 | 8.58 | 9.24 | 8.74 |
| $f_1/f_w$ | −1.65 | −1.73 | −1.65 | −1.91 | −1.98 |

What is claimed is:

1. A zoom lens comprising, sequentially from an object side:

a first lens group having negative refractive power;

a second lens group having positive refractive power; and a lens group having positive refractive power on an image side of the second lens group, the zoom lens performing a magnification change operation by changing a gap between the adjacent lens groups, wherein the second lens group includes a lens Lp having positive refractive power, and the zoom lens satisfies following expressions (1) to (5):

$$0.85 < f_2/f_{2p} < 1.50 \qquad (1)$$

$$0 < f_2/f_w < 3.25 \qquad (2)$$

$$-0.30 < \Delta Pdt\_2p < -0.10 \qquad (3)$$

$$1.50 < Nd_2 < 2.00 \qquad (4)$$

where $f_2$ is a focal length of the second lens group, $f_{2p}$ is a focal length of the lens Lp, $f_w$ is a focal length at a wide angle end of the zoom lens in infinity focus, $\Delta Pdt\_2p$ is an extraordinary dispersion property between a d line and a t line of the lens Lp, and $Nd_2$ is a refractive index of the lens Lp at the d line.

2. The zoom lens according to claim 1, wherein the lens Lp is a plastic lens.

3. The zoom lens according to claim 1, wherein the zoom lens satisfies a following expression (6):

$$1.5 < \beta_{2t}/\beta_{2w} < 4.0 \qquad (6)$$

where $\beta_{2t}$ is a lateral magnification at a telephoto end of the second lens group, and $\beta_{2w}$ is a lateral magnification at a wide angle end of the second lens group.

4. The zoom lens according to claim 1, wherein the second lens group includes a cemented lens including a lens having negative refractive power and a lens having positive refractive power that are cemented together, and the zoom lens satisfies a following expression (7):

$$3.0 < |f_s/R_s| < 20.0 \quad (7)$$

where $f_s$ is a focal length of the cemented lens, and $R_s$ is a radius of curvature of a cemented surface of the cemented lens.

5. The zoom lens according to claim 1, wherein the zoom lens satisfies a following expression (8):

$$-2.8 < f_1/f_w < -1.5 \quad (8)$$

where $f_1$ is a focal length of the first lens group.

6. The zoom lens according to claim 1, wherein at least one lens having negative refractive power in the second lens group is a plastic lens.

7. An imaging apparatus comprising:

the zoom lens according to claim 1; and a solid-state image sensor disposed on an image side of the zoom lens and configured to convert an optical image formed by the zoom lens into an electrical signal.

* * * * *